United States Patent [19]

Nahra et al.

[11] E Patent Number: Re. 32,695

[45] Reissued Date of Patent: Jun. 14, 1988

[54] METHOD AND APPARATUS FOR TREATING FLUENT MATERIALS

[75] Inventors: John E. Nahra, Potomac, Md.; Walter Woods, Woodsville, N.H.

[73] Assignee: DASI Industries, Inc., Chevy Chase, Md.

[21] Appl. No.: 830,291

[22] Filed: Dec. 12, 1985

Related U.S. Patent Documents

Reissue of:

[64] Patent No.: 4,419,301
Issued: Dec. 6, 1983
Appl. No.: 277,606
Filed: Jun. 29, 1981

U.S. Applications:

[63] Continuation of Ser. No. 83,362, Oct. 10, 1979, Pat. No. 4,310,476, which is a continuation-in-part of Ser. No. 29,391, Apr. 12, 1979, abandoned, which is a continuation of Ser. No. 806,849, Jun. 15, 1977, abandoned.

[51] Int. Cl.[4] ..... B01F 3/04

[52] U.S. Cl. ..... 261/118; 99/453; 99/467; 99/483; 137/12; 137/88; 137/188; 239/561; 239/566; 261/64.3; 261/115; 261/116; 261/129; 261/131; 426/521; 426/522

[58] Field of Search ..... 261/64 B, 66, 69 R, 261/76, 103, 106, 110–112, 114 R, 115–118, 129–131, DIG. 10, DIG. 13, DIG. 32, DIG. 33, DIG. 75, DIG. 76, DIG. 77; 99/453–455, 467, 483; 426/471, 511, 474–476, 521, 522; 239/561, 566; 55/241; 159/13.1

[56] References Cited

U.S. PATENT DOCUMENTS

| | | | |
|---|---|---|---|
| 441,106 | 11/1890 | Monsanto | 261/118 |
| 825,575 | 7/1906 | Barkelew et al. | 239/566 X |
| 1,009,963 | 11/1911 | Gamblin | 261/111 |
| 1,054,650 | 2/1913 | Vouga | 159/13.1 X |
| 1,538,457 | 5/1925 | Zoelly | 261/118 X |
| 1,984,956 | 12/1934 | Anglim | 99/453 X |
| 2,089,132 | 8/1937 | Murray | 426/474 |
| 2,376,298 | 5/1945 | Welp | 261/116 |

(List continued on next page.)

FOREIGN PATENT DOCUMENTS

| | | |
|---|---|---|
| 970539 | 9/1966 | Canada . |
| 991156 | 5/1967 | Canada . |
| 840942 | 5/1970 | Canada . |
| 845066 | 6/1970 | Canada . |

(List continued on next page.)

OTHER PUBLICATIONS

"Making Sterile Milk that the U.S. Will Buy", *Business Week*, Oct. 25, 1976.

"Falling Film UHT System Extends Ice Cream Mix", *Food Engineering*, Oct. 1976.

"Produces Bacteria-Free Milk Without 'Cooked' Flavor", *Food Processing*, Jul. 1975.

"Heating Milk for Microbial Destruction: A Historical Outline and Update", *Journal of Food Protection*, vol. 41, No. 2, pp. 122–130, Feb., 1978.

(List continued on next page.)

*Primary Examiner*—Richard L. Chiesa
*Attorney, Agent, or Firm*—Roland T. Bryan

[57] ABSTRACT

A process for heating fluids to a relatively high temperature, such as sterilization temperature, in which the fluid, such as a liquid, is heated by direct contact with steam while it is in the form of a very thin, free-falling film or a continuous falling stream so that heating of the fluid is accomplished without the fluid coming into contact with any surface and particularly metal surfaces which are hotter than the fluid product being heated and with minimum agitation and turbulence of the fluid product. This procedure enables maximum and uniform heat penetration in a minimum time interval with the film or stream being maintained as thin as possible and unbroken by introducing steam at a relatively low velocity in a large volume vessel. A flow control is incorporated into the apparatus to maintain a constant flow rate of fluid and to maintain a constant and critical fluid level in the bottom portion of the large volume vessel with the flow characteristics of the apparatus and the internal forces produced by the apparatus serving to counterbalance each other to provide a relatively simple but yet accurate flow rate and liquid level controls for the fluid being heated.

14 Claims, 10 Drawing Sheets

U.S. PATENT DOCUMENTS

| | | | |
|---|---|---|---|
| 2,873,816 | 2/1959 | Umbricht et al. | 55/241 X |
| 2,899,320 | 8/1959 | Davies et al. | 426/474 |
| 2,909,985 | 10/1959 | Abrams | 99/453 |
| 2,975,069 | 3/1961 | Laguilharre | 426/522 |
| 3,032,423 | 5/1962 | Evans | 261/112 X |
| 3,041,958 | 7/1962 | Abrams et al. | 99/453 |
| 3,156,176 | 11/1964 | Wakeman et al. | 99/453 |
| 3,230,095 | 1/1966 | Stewart, Jr. | 99/454 X |
| 3,263,933 | 8/1966 | Porwancher et al. | 239/561 X |
| 3,621,902 | 11/1971 | Okada et al. | 426/471 X |
| 3,743,256 | 7/1973 | Oplatka | 261/112 X |
| 3,771,434 | 11/1973 | Davies | 99/454 |
| 3,847,714 | 11/1974 | Davies et al. | 261/115 X |
| 3,913,838 | 10/1975 | Richter | 239/561 X |
| 4,160,002 | 7/1979 | Janovtchik | 99/453 X |
| 4,161,909 | 7/1979 | Wakeman | 99/453 |

FOREIGN PATENT DOCUMENTS

| | | |
|---|---|---|
| 413460 | 7/1934 | United Kingdom . |
| 967125 | 8/1964 | United Kingdom . |
| 1057286 | 9/1965 | United Kingdom . |
| 1021829 | 3/1966 | United Kingdom . |
| 1021830 | 3/1966 | United Kingdom . |
| 1033546 | 6/1966 | United Kingdom . |
| 1140507 | 1/1969 | United Kingdom . |
| 1217959 | 1/1971 | United Kingdom . |

OTHER PUBLICATIONS

"Milk Lasts 4 months at 95 Degrees", *The Baltimore Sun*, Oct. 26, 1975.

W. C. Woods and C.A.N. Facas, "The DASI Free Falling Film System, Its Design and Commercial Applications in the Dairy Industry", New England Milk Dealers Association Convention, Jun. 9, 1976.

W. C. Woods, "The DASI Free Falling Film Method for Ultra-Pasteurization of Dairy Products", First National Aseptic Packaging Conference, Dec. 16–17, 1974.

W. C. Woods and C.A.N. Facas, "Sterilized Ice Cream Mix", University of Maryland-Ice Cream Conference, Mar. 31, 1977.

"Falling Film Sterilizer Comes of Age", *Food Engineering*, vol. 45, No. 12, Dec. 1973.

Licensing Agreement for First Commercial Use of DASI System Signed with McDonald", *Dairy Industry News*, Apr. 12, 1974.

"Practical Reduction of Orthokinetic Flocculation in Processing of Sterile Milk Concentrates", *Journal of Dairy Science*, Aug. 1965, vol. XLVIII, No. 8, pp. 1001–1009.

"Milk Processed by a Falling Film Pasteurizer-Sterilizer, 1. Microbial Stability at Various Processing Temperatures", *Journal of Dairy Science*, Jun. 1976, vol. 59, pp. 1003–1009.

"Impianto di Sterilizzazione (DASI-FRAU) UHT Sterilizer Installations de Sterilisation Sterilisationsanlage" (undated).

"Impianto UHT DASI-FRAU (Sterfilm) Sistema", Free Falling Film, Nuova Frau s.p.a. (undated).

"Ultra Pasteurization Tested at Maryland U," by Ralph Selitzer Dairy & Ice Cream Field.

"University of Maryland Is Testing New Free-Falling-Film Ultra-Pasteurization System" by Robert J. Krebs, American Dairy Review, Jan. 1975.

METHOD AND APPARATUS FOR TREATING FLUENT MATERIALS

Matter enclosed in heavy brackets [ ] appears in the original patent but forms no part of this reissue specification; matter printed in italics indicates the additions made by reissue.

RELATED APPLICATIONS

This is a continuation of application Ser. No. 083,362 filed Oct. 10, 1979 now U.S. Pat. No. 4,310,476. Ser. No. 083,362 is a continuation-in-part of application Ser. No. 29,391 filed Apr. 12, 1979 which is a continuation of application Ser. No. 806,849, filed June 15, 1977 both now abandoned. *This application is a reissue application of U.S. Pat. No. 4,419,301, issued on Ser. No. 277,606 filed on June 29, 1981.*

BACKGROUND OF THE INVENTION

1. Field of the Invention

The present invention relates to a process and apparatus for sterilizing fluent materials without disturbing the natural flavor and stability of these materials. The invention has particular application to fluent food products.

2. Description of the Prior Art

The science of preserving food products has been studied continuously from the stone age to the present day. The application of heat to food products as a preservation technique was probably first used to cook and dry meat in stone age human societies. A major step forward in heat treatment of fluid food products was made in the 19th century with the development of pasteurization, a process of partial sterilization involving subjecting a substance, particularly a liquid, to a temperature for a period of time that destroys disease-causing organisms without major chemical alteration of the substance. Numerous other techniques have been developed more recently wherein fluent food products are completely sterilized to eliminate bacterial spoilage and permit storage without refrigeration. However, the affluent consumers of modern food products do not view the use of preserved foods simply as a technique of staving off starvation, but rather have the option to choose the most appealing food products at will. Thus the factors that make food products appealing to modern consumers have become the most critical factors to be observed in food processing and preservation. The most crucial of these factors without doubt are taste and convenience. Of these two factors taste is perhaps paramount although convenience is becoming more and more critical, especially as it relates to energy conservation.

Referring first to the concept of taste, it is believed clear that if modern consumers are presented with two preserved food products, one of which tastes the way they expect it to taste, and the other of which tastes even slightly different from the way they expect it to taste, the first product will attain wide commercial success, while the second product will be saleable, if at all, only if its cost is significantly less than that of the first product. Proper taste is an especially critical factor in products such as milk to which virtually everyone is exposed during his lifetime. Nearly every consumer has tasted milk and knows exactly how it should taste. In many cases consumers have also tasted sour or slightly sour milk and various forms of fully-sterilized or processed milk. Due to such wide-spread and often lifelong experience, consumers develop an acute sensitivity to taste variation in milk products. Similar circumstances apply, although to a lesser degree, to other common products such as orange juice, beer, selected types of soup and the like, although milk as a product that one experiences virtually from birth, is a matter of particular sensitivity to consumers. Thus a major technical problem that has nagged the dairy industry from its inception is the development of a technique for fully sterilizing milk without perceptibly changing its taste. Although the industry has actively researched this problem since before the beginning of the twentieth century, every solution which has been proposed has failed due to the complex nature of milk itself and due to the high sensitivity of the consuming public to slight variations in the taste of sterilized or processed milk.

The second previously mentioned factor of major concern to moder consumers is that of convenience. Consumers are willing to pay a substantial premium for food products which are particularly convenient to use or store. Consumers are particularly well aware of the short shelf life of milk and the need to keep it refrigerated. Accordingly they customarily make far more trips to market for the purpose of purchasing milk than for any other reason, according to studies conducted by the U.S. Department of Energy. Such additional trips to market for the purpose of purchasing only one product are becoming more and more burdensome and inconvenient with the increasing cost and decreasing availability of automotive fuels. Furthermore, the need to continuously refrigerate fresh milk creates additional inconvenience and loss of economy. Refrigeration requires substantial energy and milk, normally being a bulky product, consumes a large portion of personal and commercial refrigerator space. The cost of fresh milk is raised by the extensive refrigeration energy expended by dairy producers, wholesalers and retailers of the product. Accordingly fresh milk as it is presently known and utilized is a product that creates considerable inconvenience in requiring numerous otherwise unnecessary trips by consumers to retail establishments and by the fact that continuous refrigeration is required. Both of these undesirable factors could be eliminated if fully sterilized milk were available. Such a product would have an extensive shelf life and would not require refrigeration so that consumers could purchase large quantities of sterilized milk at regular intervals for storage without refrigeration. Similarly, wholesalers and retailers could also store large quantities of the product without refrigeration, thereby reducing the overall cost of the material to the consumer. Consumers would experience multiple savings in utilizing a sterilized milk product in the form of fewer trips to the store resulting in less fuel consumption and, in some cases, the need for fewer automobiles per household as well as in possibly reduced energy costs due to the possibility of utilizing smaller refrigerators.

While sterilized milk clearly possesses a number of advantages from the point of view of convenience and energy saving, the problem of its production without substantial taste distortion relative to fresh milk has prevented sterilized milk from gaining a substantial foothole in the consumer market. It is the complex chemistry of milk which makes it particularly subject to changes in taste upon heat treatment. To fully understand this taste sensitivity of milk to heat treatment, it is believed that a brief summary of milk chemistry is in order.

It is well known to those skilled in the art that milk contains among its various constituents the following nutrient items:

Water
Proteins, such as casein, lactalbumin, lactoglobulin
Vitamins
Gases
Milk fat
Lactose (sugar of milk)
Milk ash
Pigments
Enzymes
Cellular material Each of these nutrients reacts differently upon exposure to various temperature ranges for selected time intervals. Thus any heat treatment of milk must take into effect the characteristics of these nutrients as well as other organisms such as bacteria, spores, yeast and mold present in non-sterile milk. Unfortunately, all of the relationships between the various elements constituting milk are not fully understood, even by those highly skilled in the art of milk chemistry. Thus it is only by experimentation with new techniques for sterilizing milk that a process and apparatus can be developed wherein sterilized milk is produced but still retains all of the desirable qualities and characteristics of fresh milk such as flavor, stability, body and color.

As a result of extensive experimentation, Elmer S. Davies and Frank D. Petersen developed a series of time-temperature relationships and a general technique which appeared promising in the development of sterile milk which maintains all of the desirable qualities of fresh milk. This development is disclosed in U.S. Pat. No. 2,899,320 (Davies et al), issued Aug. 11, 1959. As is pointed out in this basic patent, to be truly effective in producing a sterilized milk that retains all of the desirable characteristics of fresh milk, a considerable number of independent reactions must be either accomplished or avoided simultaneously. Specifically, living organisms must be completely sterilized and enzymes inactivated. However "browning" and coagulation must be avoided. "Browning" is due to the heat sensitivity of lactose and casein as present together in milk. Similarly, coagulation is a function of temperature resulting from the combination of casein, milk sugar and whey in the protein content of milk. Coagulation results in an undesirable increase in the viscosity of the milk and produces an "off" flavor which is highly objectionable and easily detectable by consumers. Furthermore, the release of sulfhydrils in the course of the heating process produces a "cooked" flavor in heated milk. Sulfhydrils are formed by the breakdown of the whey portion of milk proteins, particularly the beta lactoglobulin upon heat treatment of milk.

In the above-referenced Davies et al patent, the following time-temperature relationship was established as the most effective in attaining full sterilization of milk with minimum effect upon its desirable characteristics: heating to approximately 300° F. for 1.5 to 3.0 seconds. Further experimentation has shown this relationship to have a temperature range of approximately 280°-310° F. and a time range of approximately 1.5 to 9.0 seconds. While this time-temperature relationship still remains optimum, it has since been discovered that more subtle factors are involved in maintaining the flavor of sterilized milk sufficiently close to that of fresh milk that consumers cannot detect the difference. These factors involve the extent of physical agitation or perturbation experienced by the milk during heating, the uniformity of heating and the extent to which the heated milk contacts surfaces hotter than itself during or subsequent to the heating interval. Furthermore, proper cooling and handling of the milk prior to and subsequent to heating have also been found to be a factor in maintaining taste perfection in sterilized milk. Because of the interaction of these many factors during the sterilizing process, extraordinarily sophisticated constraints have been imposed upon any sterilization system which is to be successful in maintaining perfect flavor quality during sterilization. The lack of detailed knowledge as to the effects of these very subtle factors on milk flavor has severely impeded the development in the prior art of any successful device or method which could successfully produce sterilized milk having a taste acceptable to the highly refined standards of modern consumers. Furthermore, the unique combination of constraints, once known, has substantially defeated prior engineers and researchers in their efforts to construct a truly satisfactory milk sterilizing apparatus.

Experimental studies conducted by Elmer S. Davies and Frank D. Petersen (see Davies et al) led to the conclusion that the risk of denaturation of milk proteins was reduced if sterilization was conducted at higher temperatures than previously used, but for shorter time intervals. The concept of heating milk to a high temperature for a short time led to further studies to determine how such heating could be most advantageously accomplished. It was eventually determined that a falling film of product provided the optimum configuration for attaining high temperature/short-time heating in view of the physical characteristics of a film. In particular, a falling film is ideally suited to rapid heating of a product because it is by nature a thin distribution of the product with a high ratio of heat transfer surface area to volume and optimum heat transfer characteristics. Thus all particles of the film can be rapidly heated to the desired temperature with excellent uniformity. The fact that the film is a continuous body of liquid enhances the uniformity of heating relative to a spray or other arrangement where droplets are separated and travel for different times along various trajectories which cannot be fully controlled. The falling film concept was also ideally suited to short heating times because the exposure time of the product to the heated environment can be very accurately controlled simply by controlling the height of the falling film. For these reasons Davies and Petersen selected a falling film as the product configuration optimally suited to the optimal time-temperature configuration they had experimentally determined for minimizing the denaturation of proteins in sterilized milk. Unfortunately, the successful formation and continuous maintenance of a falling film proved to be an extremely difficult technical problem which Davies and Petersen were unable to solve. The disclosure in the above-referenced Davies et al patent sets forth their proposed technique of providing a film which adheres by surface tension to guide plates, and is heated while in contact with these guide plates. For reasons which are made clear elsewhere in the present specification, heating a falling film while it is in contact with a guide plate of this nature is not suitable from a practical standpoint because flavor distortion occurs and the product burns onto the guide plate after a short period of use. Nevertheless the discovery that a falling film of product is ideally suited to the time-temperature relationship developed in the Davies et al patent remains an important advance in the state of the art of milk sterilization.

Of the prior art devices, the most advanced for producing sterilized milk that maintains taste qualities similar to that of fresh milk is disclosed in U.S. Pat. No. 3,771,434 to Davies, issued Nov. 13, 1973. The present invention is an improvement and an outgrowth of the apparatus disclosed and claimed in that patent. The apparatus disclosed in Davies relies upon a falling film of liquid milk which is guided by contact with a length of screen, wherein the falling film is subjected to high temperature steam for a short interval to cause sterilization. A number of important refinements have now been discovered which substantially improve its performance. More specifically, experimentation with the system disclosed in Davies has revealed that product taste, quality and long-term consistency could be significantly improved with proper modification of the disclosed system. It should be noted that the device disclosed in the Davies patent is far different from devices which have been relied upon in the past for evaporation of liquids. A device used for evaporation is disclosed, for example, in the Monsanto U.S. Pat. No. 441,106 issued on Nov. 18, 1890. In that patent a liquid is divided into fine droplets and subjected to heating whereby rapid evaporation of the falling liquid droplets occurs. Naturally, the use of such a system would be disastrous in the production of sterilized liquid milk because the evaporation which would occur, even if it were only partial, would significantly change the consistency of the milk, thereby making it highly undesirable to consumers.

A need therefore exists for an improved sterilization system for fluid or liquid foods wherein complete sterilization is obtained without adversely effecting the taste or other qualities of the food product.

SUMMARY OF THE INVENTION

Accordingly, one object of this invention is to provide an improved process and apparatus for sterilizing food products without adversely effecting their taste or other physical properties.

Another object of the present invention is the provision of a novel method and apparatus for heating fluids to a selected temperature for a selected interval of time with a minimum of turbulence, agitation or physical stress.

Yet another object of the present invention is the provision of a novel method and apparatus for sterilizing fluid foods, such as milk with a minimum of thermal and physical perturbation.

Another object of the present invention is the provision of a novel method and apparatus for sterilizing milk which causes the least possible denaturation of whey proteins and comparable to that of pasteurization.

A still further object of the present invention is the provision of a novel method and apparatus for sterilizing fluid foods wherein an isolated film of the product is formed and is subjected to heat treatment at a particular temperature for a selected time interval, during which interval it is subjected to an absolute minimum of physical stress.

Briefly, these and other objects of the invention are attained by the provision of a unique apparatus in which the fluid to be treated is first formed into a continuous isolated film which is kept free from contact with any surface hotter than itself for a selected interval of time. The apparatus is designed so that the film remains intact as a continuous film for the entire period during which it is subjected to heat treatment. Heat treatment is provided by subjecting the film to a high temperature gas, such as steam, which is supplied so as to prevent any turbulence which would disturb the fluid film. The film is rapidly cooled subsequent to heat treatment. Details of the apparatus utilized in this process are also disclosed, as is the control system for the overall process and apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
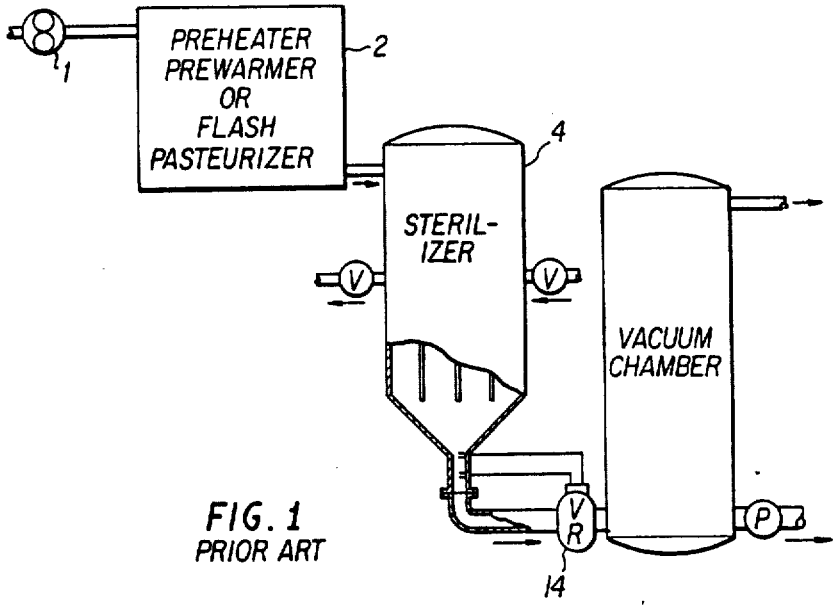
FIG. 1 PRIOR ART
FIG. 1 is a schematic illustration on one form of prior art sterilizing system, from Davies et al U.S. Pat. No. 2,899,320.

Although the present invention is applicable to an unlimited variety of fluent or liquid products, including such products as beer, orange juice, soup containing particulate matter such as meat and vegetables and other non-food products, many of the detailed aspects of the preferred embodiments are described as utilized with milk, since of all foods milk is perhaps the most complex and requires the most delicate and precise handling in its sterilization if flavor distortion is to be prevented. Accordingly emphasis is placed in this specification on the treatment of milk with the understanding that numerous other foods can be treated in substantially the same manner but with much less complexity.

Attention is first directed to TABLE 1 which deals with the sterilization of milk. In this TABLE a number of thermal and physical effects are described in the left-hand column while the resultant distortions to flavor or other physical properties of the milk are set forth in the right-hand column. TABLE 1 points out the unique sensitivity of milk to heat treatment, and particularly emphasizes the fact that milk is especially sensitive to heat treatment (thermal perturbation) and to physical perturbations (i.e. excessive agitation) during heating. A technique for eliminating the undesirable effects of thermal perturbations in milk sterilization is set forth in the above-referenced Davies et al U.S. Pat. No. 2,899,320.

while subject to thermal stress. In other words, any substantial turbulence, agitation or physical stress experienced by the milk while it is at the high temperature required for sterilization causes an unmistakable change in the flavor of the milk. Specifically, the milk may develop a chalky or sandy taste or flavor. Similarly, a scorched or burned flavor may develop if the milk engages a surface which is hotter than that of the milk itself even though contact may occur over a small surface and for a short time, such as over plates and screens. Accordingly, a problem thought by many to be insurmountable was presented to the present inventors: how to heat milk to a temperature of approximately 300° for a period of only one second and then rapidly reduce the temperature below 165° while preventing the milk from experiencing any substantial turbulence, agitation or physical stress and preventing the milk from engaging a surface having a higher temperature than the milk itself. Furthermore, the solution, to have any commercial merit, required a system which was relatively simple to construct, inexpensive to produce, and self-cleaning to the maximum extent possible so that it could easily be maintained in sterile condition for long production runs. A successful device capable of commercial exploitation, must solve all of these problems and maintain a fully uniform or consistent output product.

Although the previously mentioned patent to Davies (U.S. Pat. No. 3,771,434) provided the closest approach to the solution of this problem known at the time that application was filed (1972), extensive research conducted by the Applicants has now revealed a series of important improvements which yield the desired result, that is, a truly sterilized milk which cannot be distinguished by the consumer from conventional fresh milk. As pointed out previously, it should be noted that the present application is couched in terms of processing milk because of the unique sensitivity of milk to heat

TABLE 1

| | Thermal/Physical Perturbation | Resulting Distortion In Flavor Or Other Physical Properties of Milk |
|---|---|---|
| Thermal | Heating of Lactose and Casein Together In Milk | Browning |
| | Maintaining Milk at a Temperature above 165° for More Than 30 Seconds | Albumin Content Starts to Coagulate and Sulfhydryls Form From One or More Proteins Present in Milk, Particularly Beta Lactoglobulin Protein, Sulfhydryls Released |
| | General Exposure to Temperatures Above 165° | Coagulation, Increase in Viscosity and "Off" Flavor, Release of Sulfhydryls Causing Cooked Flavor. |
| Physical | Agitation During Heating | Coagulation Occurs More Readily |
| | Exposure of Milk to Metal and Other Surfaces at Significantly Higher Temperature Than the Milk | Burned or Scorched Flavor |
| | Turbulence, Agitation and Physical Stress at High Temperatures | Sandy, Chalky Taste or Coconut Flavor Results |
| | Improper Steam Injection | Sandy taste, Sediments, Oiling Off |
| | Agitation and Turbulence in Holding Tube | Oiling Off, Fat Separation |
| | Changing Parameters Anywhere in Sterilizing System | Inconsistency in Product Quality or Taste |

In that patent it is revealed that a proper time-temperature relationship is one of the keys to removing the undesirable effects of thermal perturbation. In particular, if milk is heated to a maximum temperature of 300° F. for a period of between 1.5 to 3.0 seconds, the appropriate heat treatment for sterilization is attained without thermal taste distortion. However, extensive research based upon the invention disclosed in the Davies et al patent has revealed that adherence to the teachings of that patent alone are not sufficient to produce milk which is free of flavor distortion. It has been discovered that milk is extremely sensitive to physical perturbations treatment. Substantially all other known liquid products, including foods and other types of liquid products, can also be processed according to the same technique, since most other products do not have the extreme sensitivity exhibited by milk to physical stress during heating.

In view of the significant sensitivity of milk to physical stress during heating, a significant aspect of the present invention is the provision of a unique method and apparatus for physically handling the milk during the process of heating it. This technique has been arrived at after substantial research and permits the milk to be heated with the least amount of physical stress, turbulence or agitation. It further permits the milk to be heated without coming into contact with any surface hotter than the milk itself. These two factors are significant, but may be subject to misinterpretation in view of what has been done in the prior art. Accordingly a brief summary of exemplary prior art in this area is considered to be necessary to fully understand the unique developments of the present invention.

Figure 2:
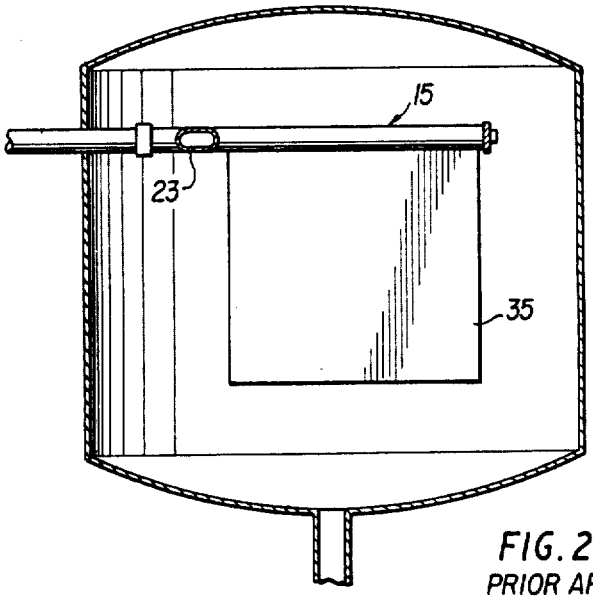
FIG. 2 PRIOR ART
FIG. 2 is a cut-away illustration of another form of prior art sterilizing system from Evans U.S. Pat. No. 3,032,423.
Figure 3:
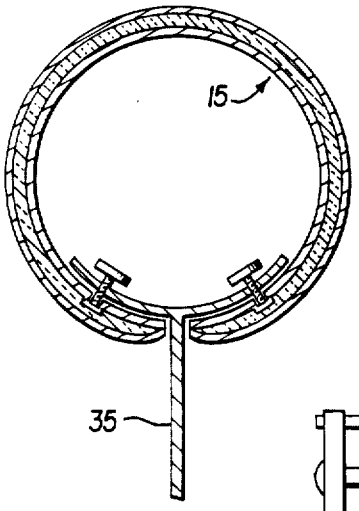
FIG. 3 PRIOR ART
FIG. 3 is a cut-away illustration showing further details of the prior art apparatus shown in FIG. 2.

As previously explained, a falling "film" of milk is ideally suited to the high temperature/short interval heating process required to produce sterilized milk of good flavor quality. Examples of falling films are disclosed in the Davies et al U.S. Pat. No. 2,899,320 (see FIG. 1) and the Evans U.S. Pat. No. 3,032,423 (see FIGS. 2, 3 and 4). While each of these patents discloses a falling film of milk in a heating vessel, the falling film is not isolated in space, but is held by surface tension to vertically disposed plates (designated 5 in Davies et al and 35 in Evans) for guiding the milk through a heating chamber. It was originally thought that the use of such plates would lead to uniformity in heating the milk since the plates would be maintained at a relatively high and constant temperature by steam or some other heated medium circulating within the heating vessel. However, it has been discovered that the exposure to such guide plates at high temperature causes product burn-on and adversely effects the taste of the resulting milk product. In particular, the taste of the milk is adversely effected by exposure to a metal surface during heating and also by exposure to a surface which is hotter than the milk itself. In the case of the vertical guide plates mentioned, it was not realized (see Davies et al, Col. 6, lines 40–45) that these surfaces become hotter than the milk being fed into the apparatus. Specifically, it has been experimentally discovered that guide plates of the type used in Davies et al and Evans (see FIG. 3) overheat at certain spots even when covered with the flowing product. Resultant "hot spots" cause the flowing product to burn onto the plate or screen. Once "burn-on" starts it rapidly gets worse and causes undesirable buildups of burned product to grow quickly, causing flavor distortion and disruption of the product flow which soon destroys uniformity of the falling film of product. "Hot spots" commonly occur at edges, weld spots, etc., and it is virtually impossible to completely eliminate them.

Figure 4:
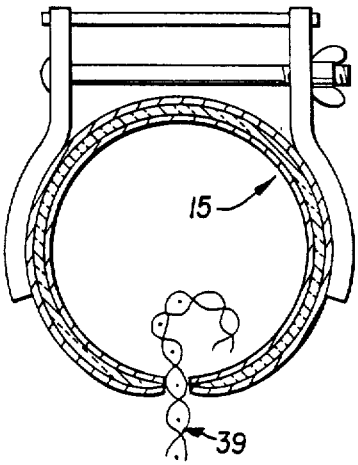
FIG. 4 PRIOR ART
FIG. 4 is a cut-away illustration showing an alternative embodiment of the prior art system shown in FIG. 3.

The same effect is illustrated in FIG. 4. In this case a screen 39 is used to form the film, but "hot spots" and burn-on continue to occur. A similar arrangement using a screen is illustrated in Davies U.S. Pat. No. 3,771,434, previously mentioned, and a similar effect occurs there. In addition, the problem of maintaining the screen sanitary is a significant one. As the screen has many small openings in its mesh, fine particles of material invariably collect on the screen surface. These materials are extremely difficult to dislodge during any cleaning period, and accordingly it is difficult to maintain the equipment in a sterile and fully sanitary condition after a short period of operation. Furthermore, clogging of the screen destroys the falling film and causes the device to stop operating effectively after a short time. Accordingly the presence of a screen in such an apparatus can three separate problems, taste distortion, accumulation of particles leading to the lack of a sterile environment, and breaking and distortions of the falling film.

In contrast to the prior art apparatuses described above, the present apparatus, illustrated in FIG. 5, includes a supply pipe 52 feeding a film forming head 54 comprised of a cylindrical length of pipe with a slit 56 along a lower surface thereof. The purpose of the film forming head is to form a thin, continuous isolated film, designated 58 in the drawings. Since the formation of the film is of considerable importance to the operation of the present invention, further details of the nature and formation of the film will be presented.

It is first pointed out that the isolated film of the present invention is a continuous film. By continuous is meant that the film is never broken into droplets, nor is any portion every disconnected from the central body of the film in the course of its fall and heating in the sterilizing apparatus of the present invention. This is in direct contrast to certain devices disclosed in the prior art which have been used particularly for the purpose of drying or evaporating liquids. For example, attention is directed to the Monsanto patent (U.S. Pat. No. 441,106 issued Nov. 18, 1890) and the Okada patent (U.S. Pat. No. 3,621,902 issued Nov. 23, 1971). In these patents the liquid material to be processed is sprayed or dropped from an appropriate distribution manifold into a heated atmosphere. However, the purpose of the spraying or dropping is to create finely divided particles or droplets of the material which provide a large surface area to permit rapid evaporation of water within the material being processed to speed evaporation. Evaporation of this sort would, of course, totally destroy the natural quality of milk sought for in accordance with the teachings of the present invention. In contrast, the present invention deals exclusively with a falling continuous film of milk from which every particle is connected to every other and no isolated droplets are formed.

The film 58 is also isolated because, once it leaves the slit 56, it never engages anything until it reaches the bottom of the sterilizing chamber (to be described subsequently). Because it is thus isolated from all components within the sterilizing chamber, the film is not contaminated by engaging any surface hotter than itself in contrast to typical prior art devices shown in FIGS. 1–4.

Because of the important function that the thin continuous isolated film has in the context of the present invention, a considerable amount of attention has been directed by the Inventors to the proper forming of this film and to forming the film in such a way that the film continues to be formed without interruption during lengthy processing runs in the apparatus of the invention. It has been observed experimentally that the configuration and appearance of a free-falling film or column of liquid changes considerably depending upon the initial velocity of the liquid prior to free fall. If the velocity is too high, droplets of liquid form, some spraying or splashing occurs and the surface of the falling body of liquid is not smooth. If the velocity or flow rate of the liquid is within a specified range, however, the falling body of liquid forms a continuous unbroken surface in free fall with a mirror-like surface and no splashing or spraying of particles results, even when the falling body of liquid impinges on a rigid surface. If the velocity or flow rate is too low, then the continuous body of falling liquid breaks into droplets since the amount of liquid in free fall is not sufficient to maintain the continuous surface of the film or column. Again spraying and splashing of liquid particles occurs.

Experimental measurements on free-falling liquid bodies passing through a slit indicate that liquids must have an average initial flow velocity falling within a prescribed range to form a continuous free falling body. In the case of water, for example, the following measurements apply:

For an initial velocity of less than approximately 1.5 feet per second, the falling film or column breaks up and the flow is not sufficient to maintain the falling liquid in a continuous state. For initial velocities between 1.5 and 3.5 ft. per second, the falling body maintains a smooth and perfectly continuous surface. For initial velocities above 3.5 ft. per second, some splashing occurs and the surface of the falling body of liquid is no longer smooth and continuous.

This experimental data indicates that the existence of a relationship between the surface tension forces acting on the particles of falling liquid, the forces of motion created by the initial velocity of the liquid prior to its entering a state of free fall, and the gravitational forces acting on the liquid during free fall. For water with an initial velocity between 1.5 and 3.5 ft. per second, an equilibrium condition is reached among these various forces resulting in the formation of a continuous laminar film or column of free falling liquid. This equilibrium may be destroyed if one or more of the variable forces is significantly changed. For example, a liquid with a vescosity different from that of water has a different range of initial velocities if a continuous free falling body of liquid is to be formed. However, all liquids, no matter what their viscosity, can be made to form continuous body in free fall simply by measuring the appropriate parameters of the liquid and appropriately controlling the forces acting on the liquid.

In the case of the present invention, where the liquid falls into a steam heated pressure vessel, the effect of steam flow on the falling liquid must also be considered. If the velocity of the steam acting on the liquid is sufficiently high, the falling body of water will be broken up and the formation of a continuous falling body will become impossible. Similarly, if the fall body of liquid is exceptionally thin and fragile, then even small stream currents will cause it to break up resulting in spraying and splashing of the falling liquid.

Based on these considerations, the following method for designing a free falling film of liquid passing through a slit has been developed in accordance with the concepts of the present invention:

1. The liquid is first studied to determine the optimum initial velocity at which a continuous body of the liquid will be formed and maintained when the liquid is in free fall.
2. The desired flow rate of the falling film is determined.
3. The length of the slit through which the film must fall is determined from the dimensions of the vessel in which it is placed, or other similar physical constraints.
4. The width of the slit is calculated so as to provide an initial velocity which is the optimum velocity of the liquid for forming a continuous body while in free fall at the determined flow rate of the liquid. Either the length or width of the slit, or both, can be varied to arrive at the desired cross sectional area which produces the desired average initial velocity.
5. The liquid flow must be evenly distributed throughout the slit so that approximately the same volume of liquid falls through each linear segment of the slit.

Figure 5:
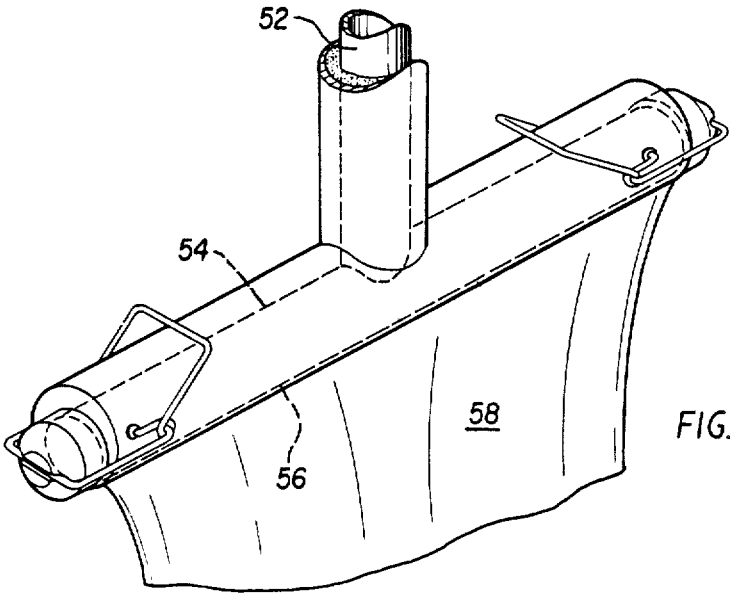
FIG. 5 is a perspective illustration of a film forming head and isolated film in accordance with the present invention.

The last of these factors, evenly distributing the liquid flow throughout the slit, has created a serious technical problem. If, for example, an arrangement of the type illustrated in FIG. 5 is used without any internal flow distribution structure, a continuous film cannot be formed. This is because fluid supplied through the input pipe 52 will not inherently distribute itself uniformly throughout the length of the film forming head 54. In fact, a distinct pressure minimum will be positioned at the center of the flow distribution head while pressure maxima will exist at opposite ends thereof. Accordingly a flow distribution structure of the type illustrated in FIG. 6 is required.

Figure 6:
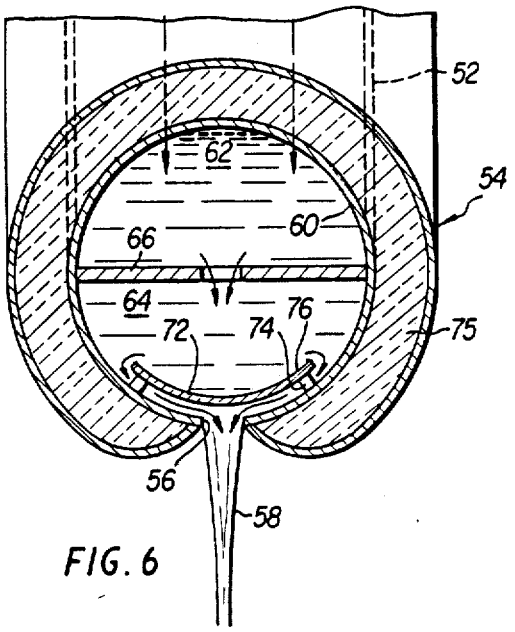
FIG. 6 is a cut-away side view of the film forming head shown in FIG. 5.
Figure 7:
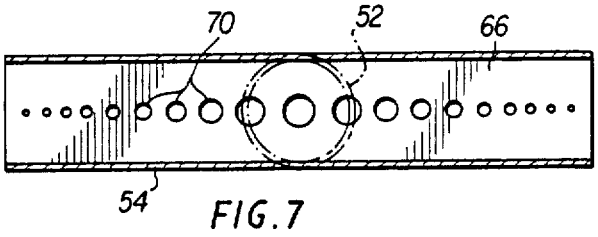
FIG. 7 is a plan view of a distribution plate.

As shown in FIG. 6, the supply pipe 52 feeds the film forming head 54. The film forming head itself is constructed of an inner pipe 60 which is divided into an upper chamber 62 and a lower chamber 64 by a distribution plate 66. The upper chamber 62 is in direct communication with the supply pipe 52 and is always completely filled with liquid. Flow rates and other parameters are determined so that the liquid surface indicated by the line 68 entirely covers the distribution plate 66 at all times. The distribution plate contains a plurality of distribution apertures 70, as illustrated in FIG. 7. The distribution apertures may be sized progressively with the largest at the center and the smallest near the extremities of the distribution plate. Thus in this arrangement the smallest distribution apertures 70 are found near the ends of the film forming head 54 where the fluid pressure is normally highest, while the largest distribution apertures are near the center of the film forming head where the pressure is normally lowest. The purpose and function of this arrangement is to provide a substantially uniform flow through the distribution plate 66 throughout its length. The actual sizing of the holes can be calculated easily using conventional mathematical analysis. Furthermore, as an alternative to varying the size of the holes along the length of the distribution plate, small holes of equal size can be used with the distribution of holes arranged to provide uniformity of flow through the distribution plate along its entire length.

The distribution plate is thus used to solve the problem of producing uniform output flow along the entire length of the flow-forming head 54. However, the individual streams of liquid falling through the apertures 70 in the distribution plate must be integrated to form a continuous film. For this reason, a trough 72 is supported within the lowest chamber 64 of the inner pipe 60 to collect the liquid falling through the distribution apertures 70. The trough 72 is supported within the lower chamber 64 by means of suitable mounting members 74 which are arranged so as not to impede the flow of liquid out of the trough over the top of its side walls 76 and out through the slit 56. This combined structure thus serves several purposes. First, flow is evenly distributed throughout the length of the film forming head by the distribution plate 66. Second, the liquid dropping through the distribution plate is integrated into a continuous body by the trough 72. Third, the trough is permitted to overflow so that the liquid flows along the walls of the lower chamber 64 of the inner pipe 60 and out slit 58 in the form of a continuous, isolated free-falling film 58.

The apparatus of FIG. 6 is normally constructed of stainless steel with external insulation 75 being formed of a suitable material resistant to degradation at high temperatures. With this structure, both sides of the slit 56 are formed of stainless steel since the inner pipe 60 is formed of that material. In some instances, for example with such products as ice cream mixes which contain sugar, stabilizers, emulsifiers and the like, some burning of the product onto the stainless steel edges of the slit 56 can occur. Such burning of the product can develop deposits which may stop flow through the slit or otherwise disturb the free-falling film 58. To eliminate this problem, a modified film forming head was developed, as illustrated in FIGS. 8 and 9.

Figure 8:
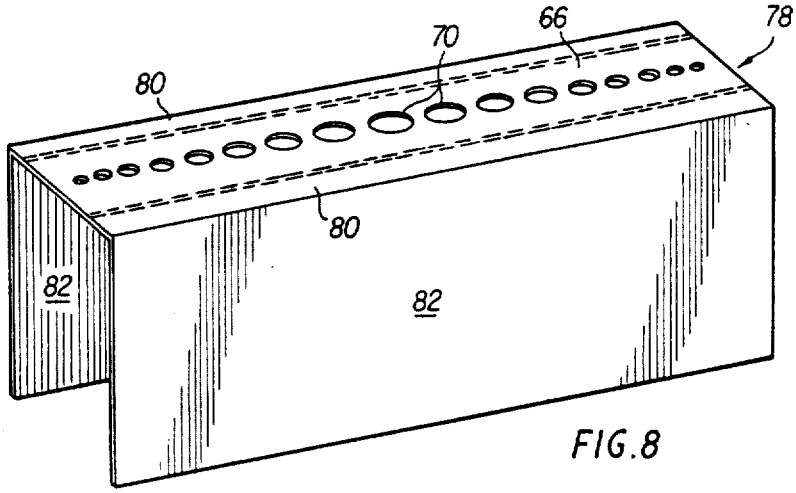
FIG. 8 is a perspective illustration of a Teflon sheet covering for a distribution plate.
Figure 9:
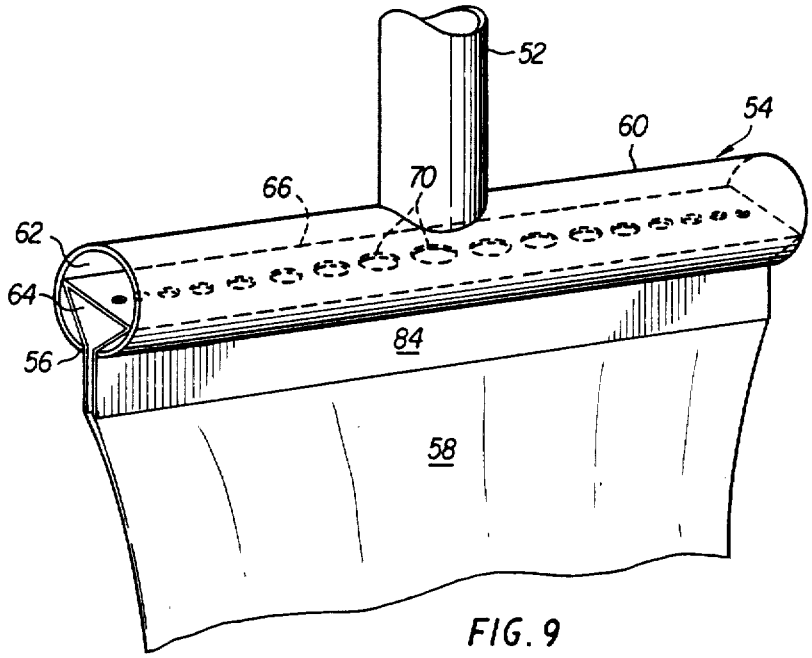
FIG. 9 is a perspective illustration of a film-forming head modified to include the structure shown in FIG. 8.

As shown in FIG. 8, a sheet of Teflon or equivalent material 78 is draped over the distribution plate 66 and held in place on the distribution plate by means of appropriate stainless steel wires 80. Apertures are formed in the Teflon sheet 78 to correspond to the distribution apertures 70 in the distribution plate. The Teflon sheet 78 is substantially wider than the distribution plate 66 thereby forming flexible side curtains 82 on opposite sides of the distribution plate. The distribution plate with the Teflon sheet draped over it is inserted into the inner pipe 60, as shown in FIG. 9. The Teflon side curtains 82 initially conform generally to the configuration of the inner surface of the pipe 60 and thus prevent the fluid dropping through the distribution apertures 70 from contacting the interior surface of the pipe 60. Furthermore, a portion of each side curtain 82 extends through the slit 56 forming a pair of flexible lips 84 hanging slightly below the film forming head 54. The thin Teflon sheet 78 thus provides both an inert surface separating the liquid product from the stainless steel surface of the inner pipe 60 (and the stainless steel sides of the slit 56) and further provides a flexible guide for forming the falling film 58. This arrangement provides a number of advantages over the structure illustrated in FIGS. 6 and 7. First, the Teflon guide eliminates contact between the product and the metal of slit 58; and thus prevents product burn-on. Furthermore, it renders the film forming head more easily cleanable in place, and thus more highly sanitary than the previously described structure. The Teflon sheet 78 also acts as a sealing gasket between the distribution plate 66 and the surface of the inner pipe 60. The flexibility of the Teflon sheet 78 and the curvature of the inside walls of the pipe 60 permit the side curtains 82 of the Teflon sheets to form a naturally narrowing channel. Furthermore, the Teflon sheets will tend to be attracted by surface tension to the fluid flowing through the slit 56, and thus will tend to adhere to the body of the fluid contained in the lower chamber 64 of the film forming head. As a result, the Teflon sheet 78 eliminates the need for the trough 72 in the embodiment illustrated in FIG. 6. In forming the falling film 58, tension in the Teflon side curtains 82 and flexible lips 84 will keep the Teflon lips 84 pressed against each other. The product pressure from inside the film forming head will force the lips 84 apart, thereby permitting the product to drop through the slit 56 while at the same time forming the product into the isolated, continuous falling film 58. This feature of the embodiment of the invention illustrated in FIGS. 8 and 9 is important since it allows a large variation in flow rates as well as the use of the invention in processing particulate matter. It also prevents steam in the sterilization chamber, described subsequently, from entering the distribution tube. This structure is also easily adjustable, extremely inexpensive and extraordinarily easy to install and remove for cleaning or repair.

Figure 10:
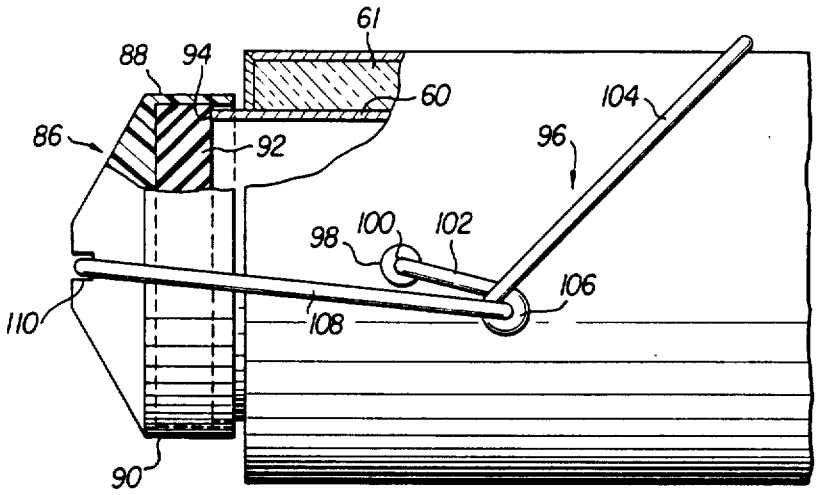
FIG. 10 is a side view of an end cap structure for a film forming head.

The open ends of the film forming head 54 are preferably closed by a removable end cap 86 as shown in FIG. 10. The end cap includes a stainless steel cap 88 having an extended rim 90 having an inner diameter somewhat greater than the outer diameter of the inner pipe 60 so that the rim fits around the pipe 60. Within the cap 88 is a sealing gasket 92 formed of Teflon, suitable rubber or another appropriate material of similar properties. The gasket presses against the open end surface, designated 94, of the inner pipe 60 providing a fluid tight seal.

The end cap 86 is held in place by a suitable overcenter or snap-action mechanism 96. This mechanism includes a pair of bearing members 98 (only one shown) secured to opposite sides of the outer surface of pipe 60. These bearing surfaces have a central recess 100 into which each of the two legs 102 of the actuator arm 104 are pivotally inserted. The actuator arm includes a pair of circular coupling points 106, one of which is located on either side of the pipe 60. A coupling member 108 of general U-shaped configuration is connected to each of the circular coupling points 106 on opposite sides of the pipe 60 and extends across a groove 110 in the end surface of cap 88.

By appropriate motion of the actuator arm 104, the end cap is either pressed in position to seal the open end of the inner gap 60 or is released from the pipe 60 to permit easy access to the interior thereof. A similar cap is positioned at the opposite end of the pipe 60.

The film forming head shown in FIGS. 6–10 is characterized as a "center feed" head because the fluid supplied to the head is delivered through the inlet pipe 52 which is positioned at the center of the film forming head 54. An alternative to this structure is the "end feed head" illustrated in FIG. 11. In this arrangement, the supply pipe 52 is coupled to a flow dividing manifold 112 which is coupled to both ends of a modified film forming head 114, whereby an equal flow of liquid is supplied to opposite ends of the head 114. This design has several important advantages over the center feed design previously described. First, no "dead flow" spots are created in the end feed design, thus providing a potentially more sanitary arrangement. The flow distributor can also be more easily cleaned and serviced in place. Furthermore, the flow is more evenly distributed and splitting or other deformation of the falling film 58 is less likely to occur. In addition the need for the end cap structure illustrated in FIG. 10 is eliminated.

Figure 11:
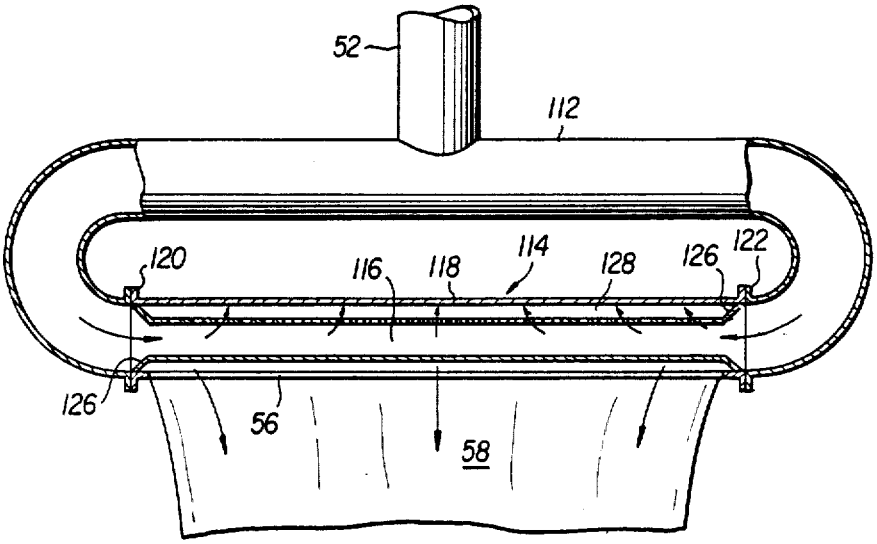
FIG. 11 is an illustration of an end feed film forming head.

The modified film forming head 114 retains the slit 56 for forming the film 58 and the entire assembly is fully insulated, although the insulation is not shown in FIG. 11. However, the film distribution plate 66 is eliminated and replaced by a flow distribution tube 116. The flow distribution tube is inserted into a length of stainless steel pipe 118 having the slit 56 in a lower surface thereof, and appropriate mounting flanges 120 and 122 to permit a fluid tight coupling with the flow dividing manifold 112.

Figure 12:
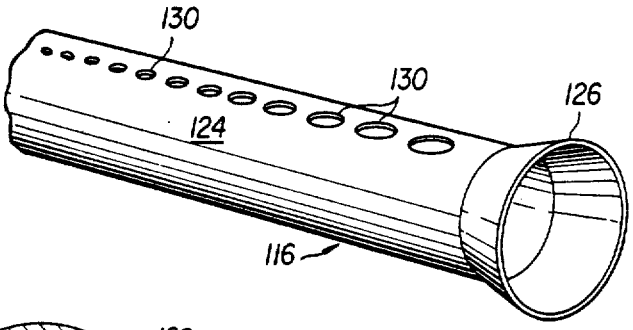
FIG. 12 is a perspective illustration of a flow distribution tube for use in the structure of FIG. 11.

The flow distribution tube 116 is illustrated in more detail in FIG. 12 as including a central body 124 having a conical end flange 126 at either end thereof. The end flange 126 may be either formed integrally with the central body 124 or may be coupled to the central body by conventional means. The outer diameter of the central body 124 is less then the inner diameter of the pipe 118 to provide a flow space 128 between these two structures. The end flange 126 at either end of the flow distribution tube is expanded to the same diameter as the inner diameter of the pipe 118, thereby providing a fluid seal for directing all fluid from the flow dividing manifold 112 into the interior opening of the flow distribution tube 116. Fluid within the flow distribution tube escapes through distribution apertures 130 drilled through the central body 124 of the distribution tube. These apertures are varied in size or density in the same manner as previously described with respect to the distribution aperture 70 of the distribution plate 66. However, the distribution pattern is different in the case of the apparatus illustrated in FIG. 12 because the pressure distribution in the end feed system is different from that in the center feed system, as will be apparent to those skilled in the art. Specifically, the size or density of the holes should be decreased toward the center of the flow distribution tube 116 and increased toward the ends thereof. The flow distribution apertures 130 are oriented toward the top surface of the distribution tube when the distribution tube is in place in the distribution head. When assembled in this manner, fluid flowing through the interior of the distribution tube 116 passes out through the distribution apertures 130 and flows around the outer surface of the distribution tube into the flow space 128 and out through the slot 56 to form the continuous isolated film 58.

Figure 13:
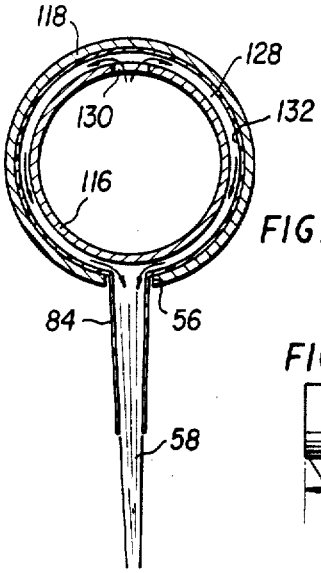
FIG. 13 is a cut-away end view of the end feed film forming head shown in FIG. 11.

A Teflon sheet 132 can be used with the end feed design shown in FIG. 11 in somewhat the same manner as the Teflon sheet 78 is used with the center feed system. As shown in FIG. 13, the Teflon sheet 132 is wrapped around the distribution tube 116 the outer surface of the flow distribution tube 116, but is maintained at the same diameter as the flanges, and is not closely pressed against the distribution apertures 130. In other words, the flow space 128 continues to exist between the flow distribution tube 116 and the Teflon sheet 132. Accordingly there is no need to drill holes in the Teflon sheet. The Teflon sheet passes through the slot 56 and again provides flexible lips 84 through which the liquid passes to form the thin, continuous isolated film 58.

It is noted that the film forming heads of FIGS. 7 and 11 are presently illustrated as being formed fundamentally of stainless steel. The same structures can also be formed of solid Teflon, with appropriate apertures being drilled or formed in the Teflon. However, in this case the apertures must be stablized by appropriate rigid inserts. For example, the slit 56 in a solid Teflon block must be stabilized by steel or an equivalent rigid structure, as it will contract and close when subjected to high temperatures if it is not appropriately stabilized.

In many instances it is desirable to have more than one film forming head in use at the same time. For instance, it may be desirable to have a plurality of heads operating within a sterilization device in order to increase the flow handling capability of the device and efficiently utilize the interior space of the device. In the past, a manual valve has been utilized for controlling the flow to each film forming head. However, when several films are in use it becomes difficult to properly adjust the valves to provide appropriate flow distribution to all film forming heads. As a result, unequal flow distribution sometimes occurs causing one or more films to be imperfectly formed so that splashing can occur causing droplets to burn onto hot surfaces of the sterilization device causing some contamination of the treated product. Furthermore, unless a flowmeter is used in each of the feed pipes, it becomes difficult for an operator to adjust the valves and visually determine the appropriate film formation for each falling film. To eliminate the expense of multiple flowmeters and other disadvantages, a unique approach to solving this fluid flow distribution problem has been developed and will now be described mathematically.

The flow equation for an incompressible liquid flowing through an orifice in a pipe is (see Mechanics of Fluids; Shames, Irving H., McGraw Hill, 1962, p. 168);

$$Q = Cd \frac{\sqrt{2}\, A_2}{\sqrt{1 - \left(\frac{A_2}{A_1}\right)^2}} \sqrt{\frac{P_1 - P_2}{\rho}} \qquad (1)$$

Where:

Cd is the coefficient of friction

Q is the flow rate $A_1$ is the cross sectional area of the pipe $A_2$ is the cross sectional area of the orifice (slit)

$P_1$ is the pressure before the orifice (slit)

$P_2$ is the pressure after the orifice (slit)

$\rho$ is the density of the liquid

For $A_1 >> A_2$ the flow can be approximated as:

$$Q = \sqrt{2}\, Cd\, A_2 \sqrt{\frac{P_1 - P_2}{\rho}} \qquad (2)$$

Equation 2 reveals that the flow in a pipe and through a slit orifice is directly proportional to the cross sectional area of the slit and directly proportional to the square root of the pressure.

Figure 14A:
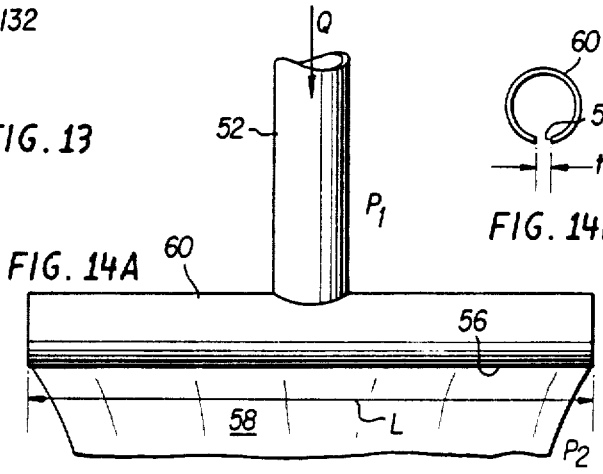
FIG. 14A is a side view of a film forming head.
Figure 14B:
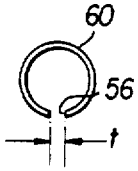
FIG. 14B is a cut-away end view of the structure shown in FIG. 14A.

FIGS. 14A and 14B depict a film forming head with an inner pipe 60 having a slit 56. According to equation 2, the flow through the slit will depend on the square root of P1–P2 and cross sectional area of the slit which is the length of the pipe times the slit width (Lt). If the difference between P1 and P2 remains constant or P1 remains constant, (since P2 is constant for all tubes), then the flow Q will be proportional to the area of the slit opening. If the slit width (t) is also the same for all tubes, then the flow Q will be proportional to the length of the tube.

For more than one film forming head in a sterilizer, if the pressure in the vertical pipe is the same for all heads, then the flow Q would be distributed proportional to the length of the film, thus providing optimum film formation for all films at a specified flow rate. The design for distributing the flow coming into the sterilizer should be such that the pressure in the film forming heads is equal for all films. If the slit widths are the same for all film forming heads, then the flow will be directly proportional to the slit length.

Figure 15:
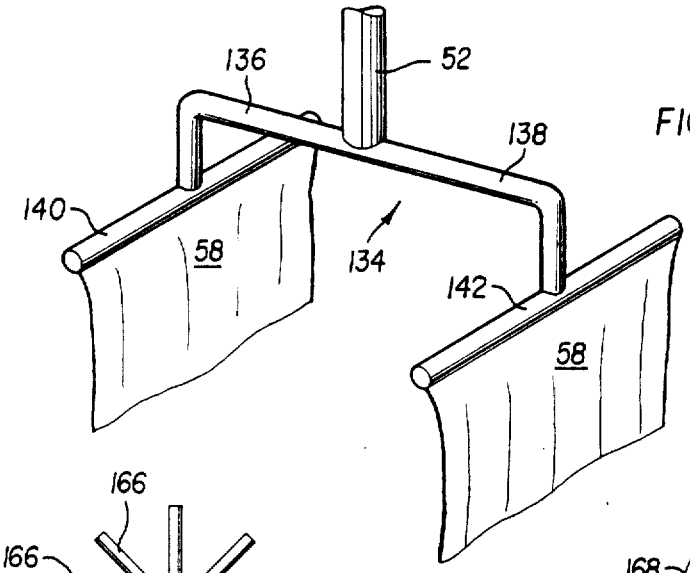
FIG. 15 is a perspective illustration of a two-film branching network.
Figure 16:
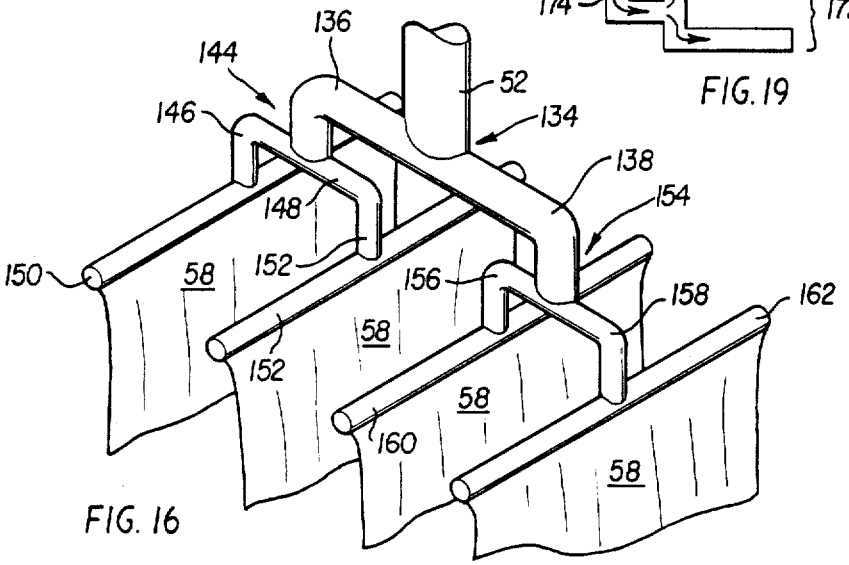
FIG. 16 is a perspective illustration of a four-film branching network.

A very simple design incorporating these concepts is shown in FIG. 15 for two films and in FIG. 16 for four films. The two film design illustrated in FIG. 14 includes the flow supply pipe 52 feeding a branch pipe 134 having two arms, each coupled to a film forming head 140, 142. These film forming heads may be equivalent in design to either the center feed or end feed units previously described. The diameter of the branch pipe 134 is constant and is the same in both arms 136 and 138. If one of the film forming heads is shorter than the other, then according to the equations set forth above the flow will be unequally distributed in the arms 136 and 138, the arm leading to the film forming head with the longer slit receiving the greater quantity of fluid. Similarly, in FIG. 16 a distribution unit for forming four separate films is illustrated. In this unit a supply pipe 52 is coupled to branch pipe 134 again having arms 136 and 138. However, the arm 136 is coupled to a second branch pipe 144 having arms 146 and 148 which are coupled to film forming heads 150 and 152. Similarly the branch pipe arm 138 is coupled to a second branch pipe 154 which in turn has two arms 156 and 158 coupled respectively to film forming heads 160 and 162. Thus the arrangement in FIG. 16 is similar to that in FIG. 15, but with an additional stage of distribution added. The same system can be scaled up to handle essentially any number of film forming heads. Although shown only for an even number of heads, the system works equally well for an odd number of heads. However, some orificing of the flow may be necessary.

Using this design, equal pressure would be provided for all film forming heads. The distributing system does not need any valves or any operator interaction. It is flexible in that unneeded film supply pipes may be capped off, and it provides optimum film formation for a given flow.

Figure 17:
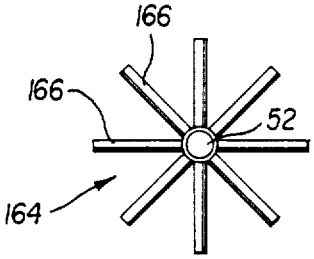
FIG. 17 is a top plan view of a radial multiple-film forming head.

Although the film forming heads have been illustrated as being formed of straight or linear lengths of pipe, or of linear pipes arranged in parallel, they need not be limited to these types of configurations. Other configurations for the film forming heads work equally well. For example, attention is directed to FIG. 17 showing a film forming head 164 comprised of a plurality of film forming tubes 166 extending radially from a central feed pipe 52. This arrangement produces a plurality of angularly separated isolated, continuous falling films which do not interfere with one another as they fall.

Figure 18:
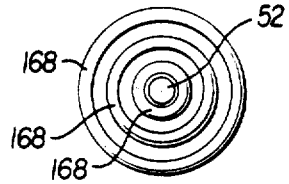
FIG. 18 is a top plan view of a concentric multiple-film forming head.

Another arrangement is illustrated in FIG. 18 wherein a plurality of concentric film falling heads 168 are shown. These heads produce isolated, continuous falling films in the form of concentric falling curtains.

Figure 19:
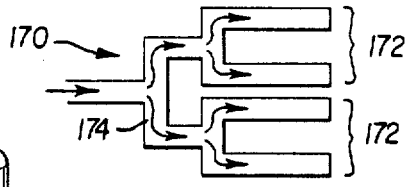
FIG. 19 is a top plan view of a parallel multiple-film forming head.

Yet another film forming head 170 is illustrated in FIG. 19 as having a plurality of film forming tubes 172 arranged in parallel and all coupled to a distribution manifold 174. Similarly, other alternative structures may also be used, as will be apparent to those skilled in the art.

Figure 20:
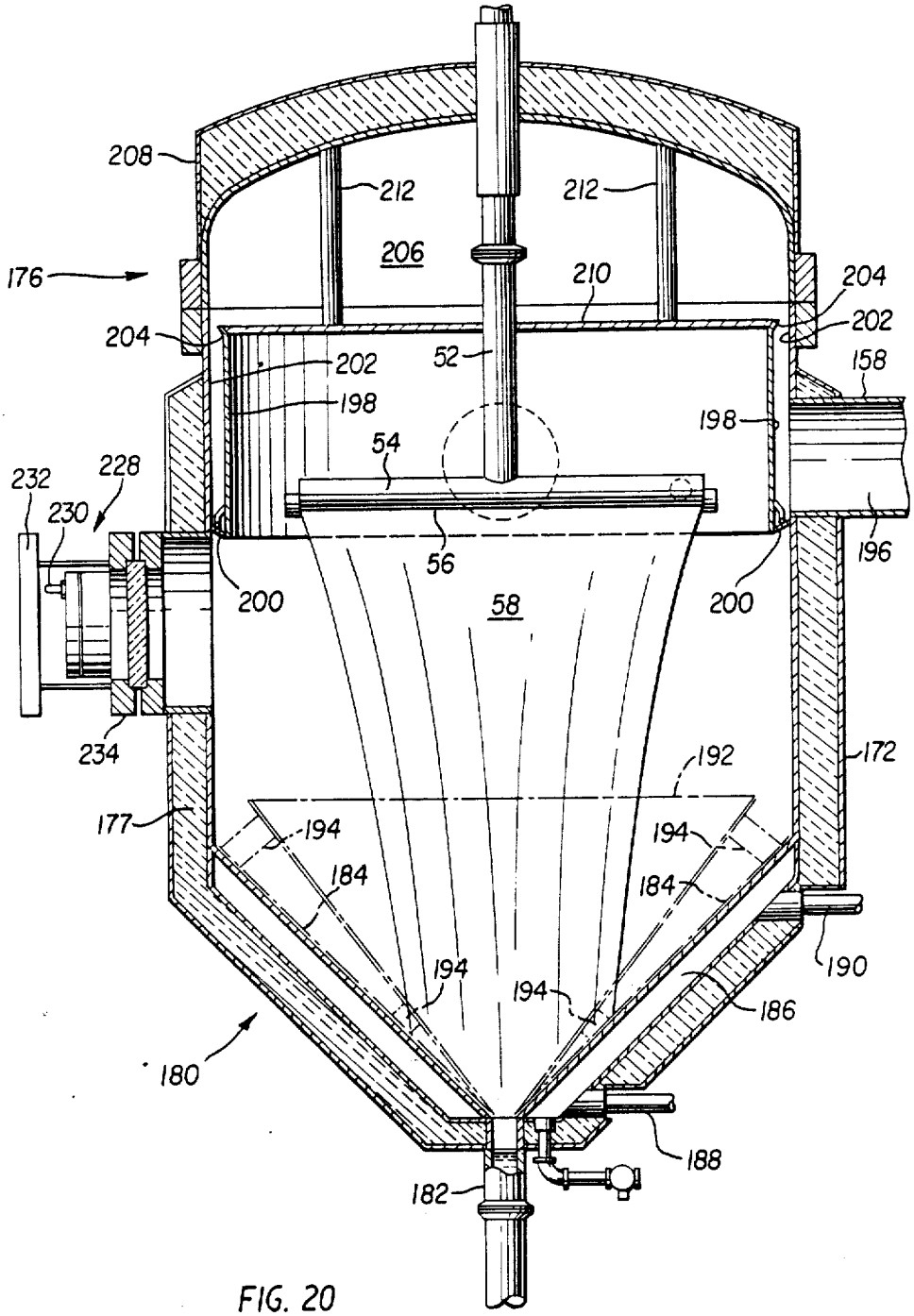
FIG. 20 is a cut away side view of a sterilization chamber or ultra high temperature (UHT) heater in accordance with the teachings of the present invention.

Referring now to FIG. 20, the film 58 of the present invention is shown positioned within a sterilization chamber or UHT unit 176. The sterilization chamber 176 is based on that disclosed in Davies U.S. Pat. No. 3,771,434 in terms of its general structural configuration including its insulated outer wall structure 177 and conical lower portion 180. The film forming head 54 including slit 56 is an improvement in accordance with the present invention, however. It should be noted in this regard that a plurality of film forming heads of any of the previously disclosed types and configurations can be used in the structure illustrated in FIG. 20 as can the flow distribution devices of FIGS. 15 and 16.

Referring again to FIG. 20, the sterilization chamber 176 includes a steam inlet manifold 178 to permit entry of the high temperature steam in such a way that sterilization of the falling continuous, isolated film 58 can take place. The lower portion of the sterilization chamber 176 is formed into conical section 180 upon which the falling continuous, isolated film 58 impinges and is collected for withdrawal through an outlet pipe 182. The interior surface of the conical section 180 may be coated with a suitable inert plastic material such as Teflon, as indicated at 184. The conical section 180 may also be provided with a cooling jacket 186 to which a cooling fluid such as air or water is supplied through a pair of inlet pipes 188 and is withdrawn through a pair of outlet pipes 190. The use of the Teflon coating 184 is important in that it prevents the heated falling continuous, isolated film from engaging a metal surface while at a high temperature within the sterilization chamber, to thereby prevent any possible flavor distortion caused by contact of the hot milk with a metal surface. The cooling jacket 186 cools the conical section 180 as well as the inner Teflon coating to a temperature below the temperature of the falling column of milk 58 (e.g. about 280° F.). Thus the falling column of milk impinges upon a surface 184 which is cooler than itself, so that the earlier mentioned criterion is met: the heated milk never impinges upon a surface which is hotter than (or even as hot as) itself in the course of the sterilizing process. This has been experimentally determined to be a highly significant factor in maintaining proper flavor quality in the sterilized milk.

It was experimentally found that using water as the coolant and increasing the flow rate of water through the jacket and thus the cooling of the cone, decreases the amount of burn-on. When the water outlet temperature reaches approximately 100° F., burn-on is completely eliminated. Because of the small surface area, actual heat transfer is small and is less than 100,000 BTU's per hour for a 12,000 qts. per hour system.

As an alternative to the Teflon coating 184 and cooling jacket 186, A Teflon cone 192 (shown in phantom) may be mounted within the conical section of the sterilization chamber upon a suitable rack 194. The cone is spaced from the walls of the conical section and has a sufficiently wide top opening to receive all of the falling liquid product. Although the Teflon cone does not provide a cooling function, it does not heat-up excessively and prevents product burn-on.

As was pointed out previously, physical perturbation of the heated milk must be minimized to prevent flavor distortion. A good example of the type of physical perturbation that can seriously damage the flavor of the milk is splashing as the film of milk 58 strikes the conical section 180 of the sterilization chamber as the sterilization heating is completed. If the film 58 is not properly formed, and is not of the proper height, the entire film, or portions of the film adjacent the edge thereof, can become discontinuous and form droplets not connected with the main body of film. This is in effect a breaking of the overall unitary surface tension which holds all of the film particles together. Once droplets of this nature are formed, substantial splashing can occur as these droplets impinge upon the lower conical surface of the sterilization chamber. This splashing may cause milk particles to contact the vertical side of the vessel, causing burn-on and flavor distortion in the portion of the milk that is highly agitated by the splashing and this flavor distortion can contaminate the entire quantity of milk passing through the sterilizer. Accordingly it is of considerable importance that the film 58 be maintained fully continuous even after it impinges upon the cooled conical section 180 of the sterilization chamber. When the film 58 is properly regulated, it does not splash when engaging the conical section, thereby virtually eliminating severe physical perturbations or agitation from the falling column of milk. This phenomenon is analogous to, and can be demonstrated by, a falling column of water from an ordinary faucet. When the faucet is turned on slightly, drops form which fall to the sink surface and splash, i.e. break up into very fine droplets which travel in all directions away from the splash zone at considerable velocity. As the faucet flow is gradually increased, the column of water becomes more continuous but may still break up into drops before reaching the sink or drain surface. In this instance splashing will still occur. However, once the faucet flow reaches the proper range, a continuous stream of water will fall unbroken to the surface of the sink and will then spread out evenly over a portion of that surface without any splashing occurring whatsoever. If the water pressure is increased further, splashing will again begin to occur. These phenomena have been described in more detail previously. The film flow in accordance with the present invention is set so as to be analogous to the faucet situation in which no splashing occurs. This condition is an equilibrium condition in which the surface tension of the falling stream is sufficient to hold all particles of the stream together, overcoming the disruptive (splashing) forces which occur when the stream impinges upon a surface terminating its fall.

It should be noted that while falling columns of fluid could be used in the context of the present invention, falling films are preferred because of their increased surface area which provides more rapid and more uniform heat transfer characteristics.

In order to maintain the isolated film 58 continuous, careful formation of the film and careful control of its height for varying circumstances must be maintained. The isolated falling film is in fact "V" shaped in the sense that it is narrower at the bottom than at the top. This shaping is caused by surface tension forces acting on the isolated film and provides an ideal shape in that the film tends to conform to the shape of the cone at the base of the sterilizer. For a particle in the middle of the film, the surface tension forces are equal and opposite on all sides. However, for a particle at the edge of the film, the surface tension forces are not balanced and the particles in the film are pulled into the film, resulting in a configuration in which the edges of the film become relatively thick as compared to the center of the film. In general, this problem is not critical, although it can be eliminated by fixing thin rods or wires (not shown) to the ends of the distribution head 54 to "stretch" the film by balancing the surface tension forces. The rods are preferably formed of Teflon to minimize the chance of flavor distortion. These rods engage only a tiny portion of each edge of the falling film, and the film thus essentially retains its "isolated" characteristics.

The height of the continuous, isolated falling film is critical. If the film is too short, insufficient time will be provided for heat transfer and penetration of the film, both of which are necessary for complete sterilization of the material being processed. If, on the other hand, the film is too long, the film will become excessively thin because of its continued acceleration due to the force of gravity, and will begin to break up causing splashing and other undesirable effects. For example, a film with an initial thickness of 0.040 inches and an initial velocity of 2 feet per second will have the thickness to height relationships as shown in TABLE 2 below.

TABLE 2

| FILM THICKNESS | HEIGHT OF FILM |
|---|---|
| 0.040 | 0 ft. |
| 0.013" | ½ ft. |
| 0.010" | 1 ft. |

TABLE 2-continued

| FILM THICKNESS | HEIGHT OF FILM |
|---|---|
| 0.0057" | 2 ft. |
| 0.0044" | 3 ft. |

For most products the optimum height of the falling film lies within the range between one and three feet. Films within this height range can be maintained continuous and splash free, providing sufficient product exposure time for adequate heat treatment.

It should be noted that in the case of the present invention, the surface upon which the falling film 58 impinges is the conical surface 180 which is inclined toward the centrally positioned outlet pipe 182. The inclination of the conical surface serves to reduce the angle of impact of the falling film 58, and thus further reduces the likelihood of splashing, as well as further reducing the overall physical agitation of the falling film as its direction of motion is changed by impingement upon the conical section 180. The same is true when the Teflon cone 192 is used.

Summarizing the foregoing disclosure, the present invention relies on a number of factors in supplying the fluent material to be processed to the sterilization chamber 176. Specifically, a unique film forming head structure is used to form a continuous fluid film. The height of this film is carefully selected to maintain the film continuous and to provide sufficient time for thorough heating to occur. The flow rate of the falling product is also carefully selected so that the falling film is maintained continuous and so that no splashing occurs. These arrangements make possible the reliable formation and continuous existence of an isolated film which is not guided by any mechanical structure, but exists independently in space for a selected interval of time.

Another aspect of the present invention is the method and apparatus for directly applying heat to fluent food products or other liquids. The concept of direct heating means that a heated gas, such as steam, directly contacts the fluent food product material without need for any type of mechanical or structural heat transfer mechanism. In the case of dairy products, steam has been found to be the most efficient medium for supplying heat to the continuous, isolated falling films previously disclosed. Since the heating medium is a factor of considerable importance in attaining the intended goals of the present invention, steam parameters and flow handling are of substantial importance to the proper operation of the invention. With dairy products the steam utilized must be culinary (purified) and fully saturated with no air or other non-condensables contained in it. Such steam can be produced by conventional techniques. Furthermore, the steam must be maintained at a suitable temperature in the range of between 285° and 320° F. to permit heating of the fluent food material to the proper temperature range of between 280° and 310° F. Steam pressure in the range from 40–70 psig has also been found to be sufficient. The rate of which steam is supplied to the sterilization chamber 176 is also a matter of considerable importance because the volume of steam determines the amount of heat delivered to the sterilization chamber. Since heat is continuously being absorbed by the falling isolated product film, additional heat must continuously be supplied in the form of more steam. It has been found that the approximate nominal steam flow rate for a sterilizer producing 12,000 quarts per hour of product would be 3,750 pounds or 24,775 cubic feet per hour to raise the temperature of milk from 150° F. to 300° F. Naturally a range of variation in these values is permissible, although they determine an approximate optimum operating point. For sterilizing systems of different flow rates or temperature ranges, the steam supply can be appropriately scaled to deliver a sufficient quantity of heat to the apparatus.

Because of the need to maintain the isolated film 58 continuous and unbroken by any form of turbulence within the sterilization chamber, the physical handling of the applied steam is also a matter of considerable importance. To supply a sufficient volume of steam to the apparatus, it has been found that relatively high flow rates are often necessary, for example on the order of 7 cubic ft. per second. Unless this flow is properly distributed, steam velocities in excess of 100 ft. per second would result. Steam supplied directly to the sterilization chamber at this velocity would, of course, totally disrupt the smooth flow of the continuous films within the sterilization chamber, thus rendering the invention inoperative since the excessive turbulence produced would cause substantial flavor distortion for reasons already mentioned. Accordingly the steam flow within the sterilization chamber 176 must be carefully controlled.

In fact, steam must be brought in with as low a velocity as possible. It was found experimentally that for milk a steam velocity above 5 f.p.s. causes breaking up of the falling film. For other products the maximum steam velocity would depend upon product viscosity and film thickness.

It is interesting to note that the maximum permisslbe steam velocity provides a minimum size (e.g., diameter) criterion for the sterilizer 176. For example, a 12,000 g.p.h. sterilizer requires 7 cubic feet of steam per second. If the steam is perfectly distributed, the sterilizer must have a minimum interior cross sectinal area of 1.4 square feet equivalent to a diameter of 1.34 feet. A safety factor of 2 yields a diameter of approximately 2.5 feet, which has proven to be a suitable size in practice.

Figure 21:
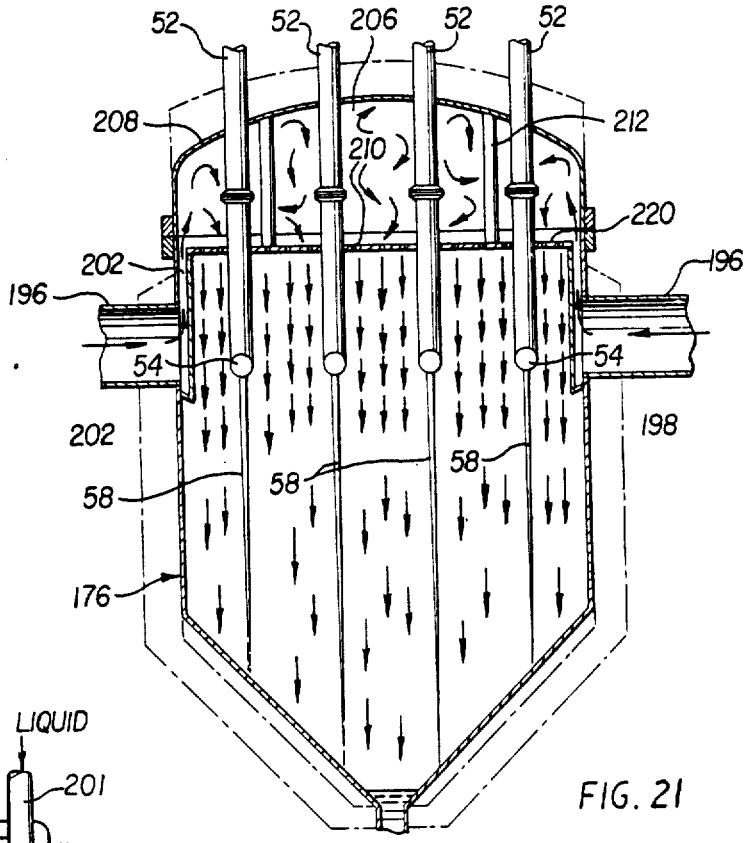
FIG. 21 is a cut away partially schematic view of the structure shown in FIG. 20 illustrating steam flow therein.

In the apparatus shown in FIG. 20, saturated steam at the temperatures and pressures previously described is applied through steam supply pipe 196 to a vertical baffle 198 which surrounds the perimeter of the sterilization chamber 176. The baffle 198 is coupled to the interior surface of the sterilization chamber 176 at its lower end 200, and is so shaped as to provide an upwardly directed channel 202 for all steam entering through the steam supply pipe 196. Thus the velocity of the incoming steam causes it to impinge upon the adjacent surface of the vertical baffle 198 and to be subsequently directed straight upwardly through channel 202 along the outer wall of the sterilization chamber. Steam flow is illustrated in FIG. 21 by small arrows. As shown in this Figure, the incoming steam flows up the steam channel 202 through the open upper end 204 of the vertical baffle 198 and into a steam circulation chamber 206 formed between a removable sterilization chamber lid 208 and a steam distribution plate 210, shown in more detail in FIG. 22. It is noted that the lid 208 may be constructed similar to the equivalent structure shown in the previously referenced Davies patent.

Figure 22:
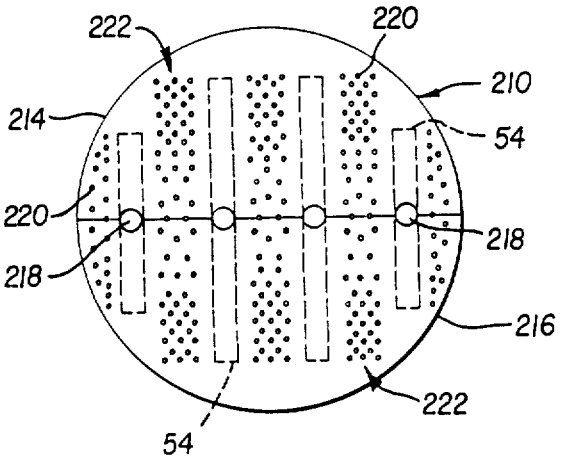
FIG. 22 is a top plan view of a steam distribution plate.

The incoming steam loses much of its directional velocity in passing through the steam channel 202 and entering the circulation chamber 208. The steam distribution plate 210 provides the final reduction in velocity necessary to slow the steam to a non-disruptive speed and also distributes and directs the steam in a direction parallel to the falling films to minimize its disturbing effect on the falling films 58 while simultaneously maximizing its absorption into the falling films. As shown in FIGS. 21 and 22, the plate 210 is preferably circular, having a diameter which allows it to cover the entire area of the sterilization chamber inside the vertical baffle 198. Thus the plate 210 meets the upper end 204 of the vertical baffle 198. The plate 210 is preferably secured to lid 208 by conventional mounting members 212.

The plate 210 may be divided into two equal halves 214 and 216 to permit ease of installation and removal. A plurality of feedpipe apertures 218 are provided along the center line where the two halves 214 and 216 of the plate 210 are joined to permit the feedpipes 52 to pass through the distribution plates 210 to supply product to the film forming heads 54. Steam distribution apertures are drilled through the distribution plate 210 in rows 222. Each row has fewer holes in the center than the ends since steam pressure in the center is at a maximum, the same concept as already described with respect to the distribution apparatus in the film forming heads shown in FIGS. 6–13. The apertures 220 may, for example, be small holes having a typical diameter of approximately one-quarter inch and distributed in such a way as to permit a uniform but low velocity diffusion of steam from the circulation chamber 206 into the region of the sterilization chamber through which the films 58 fall. The rows 222 of apertures are aligned parallel to the film forming heads 54, and thus parallel to the falling films 58. Accordingly, as shown in FIG. 21, steam passing through the apertures 220 form a curtain on either side of the falling films 58, thus providing the maximum exposure of the low velocity steam to the falling films, while at the same time reducing to an absolute minimum any disturbing influence that the flowing steam might have on the falling films. As a result almost no turbulence is experienced by the falling isolated films 58, while the films are rapidly heated to the desired sterilization temperature by absorption of the steam curtains.

Figure 25:
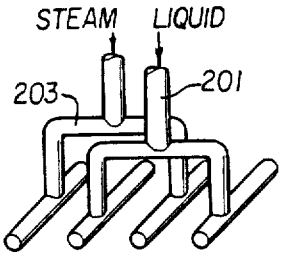
FIG. 25 is a perspective illustration of an alternative steam distribution device.

FIG. 25 shows an alternative to the steam flow structure illustrated in FIGS. 21 and 22 using a steam distribution system having a piping tree similar to that shown in FIG. 15 or 16. In this instance, a first piping tree 201 of the type illustrated in FIG. 16, for example, would be used to handle the product and form the films 58 as shown in the figure. A second piping system 203 of virtually identical configuration would be positioned adjacent the product handling system to provide steam distribution. In other words, adjacent to each of the film forming heads in the embodiment of FIG. 16, a steam curtain forming head would be positioned. The steam curtain head would have the same exterior configuration as the illustrated film forming heads, and would simply have a slit or row of small apertures along the lower surface thereof to permit a steam curtain to be formed and discharged parallel to the surfaces of the falling films. The steam pipes do not require insulation and flow characteristics are different since steam flow requires a larger cross sectional area for the slits than liquid flow.

Actual heating of the falling isolated film 58 occurs very rapidly due to direct absorption of heated steam by the product being processed. Thus a substantial amount of heat (i.e. the heat of condensation) is released by the steam and transferred to the product causing a rapid temperature increase in the product. The additional water added to the product by absorption of the saturated steam is subsequently removed from the product in the flash cooling step to be described subsequently.

It is noted that saturated steam is the suggested heating medium for use with dairy products such as milk, in view of the need to obtain a temperature on the order of 300° F. However, other fluent products can be treated in the system at whatever temperatures are required. In this respect, it is noted that the system provides a unique advantage in that the heat treatment temperature can be controlled to a high degree of accuracy heretofore not possible. Steam or other gases can be used for high temperatures while heated air and steam can be used at temperatures of 200° F. and below.

Figure 23:
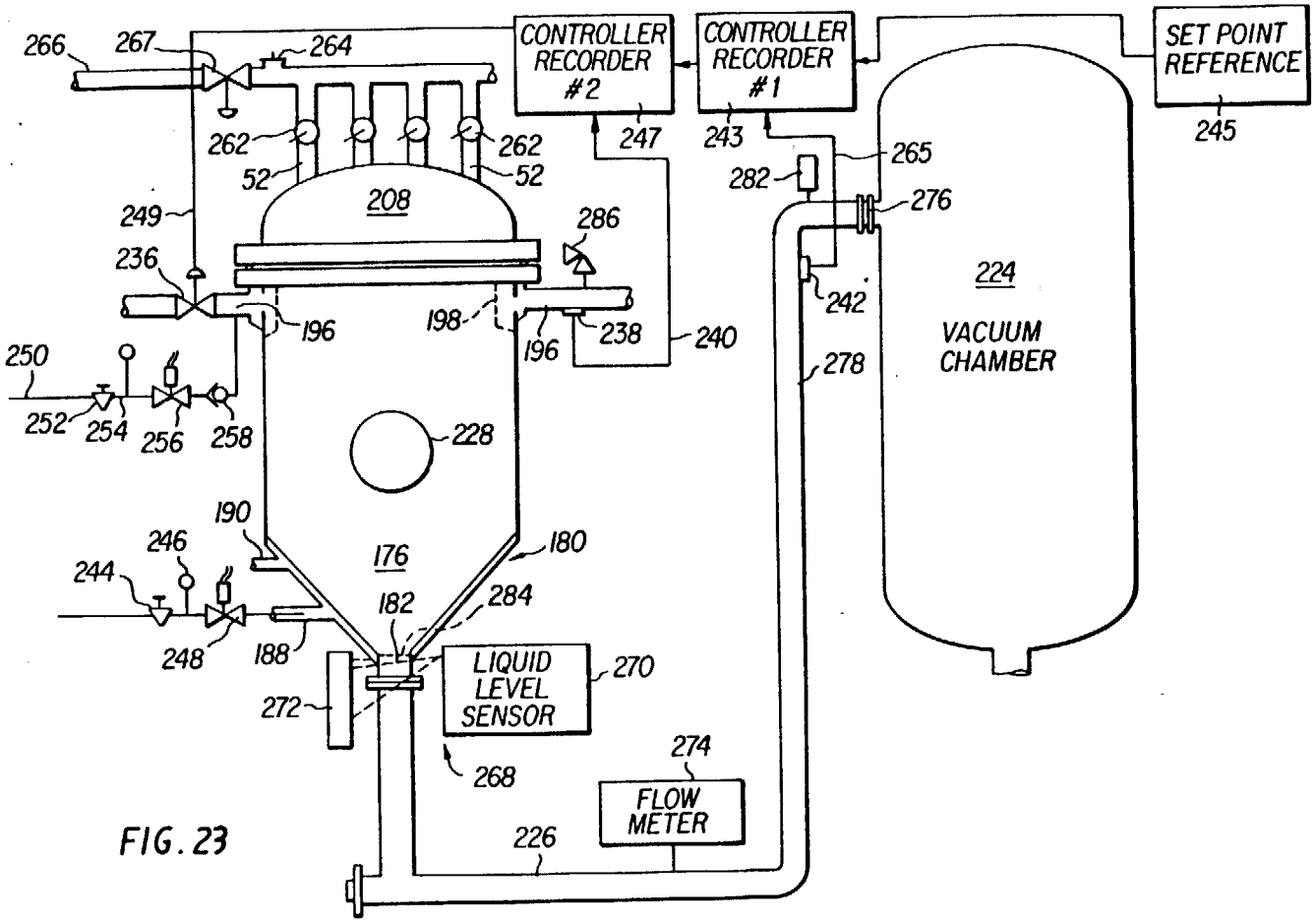
FIG. 23 is a schematic diagram illustrating input and output couplings to the sterilization chamber of the invention.

Attention is now directed to FIG. 23 which is somewhat similar to FIG. 1 in that it illustrates a partial system including the sterilization chamber of sterilizer 176 coupled to a vacuum chamber 224 by means of a holding tube 226. It is noted that in operation the sterilizer 176 should be placed adjacent to the vacuum chamber 224 so that a minimal length holding tube can be used. In addition, the inlet to the vacuum chamber should be at least two feet higher than the product outlet 182 at the base of the sterilizer to provide a proper product flow. A sight glass 228 is shown located at approximately the center of the sterilizer 176. The details of the sight glass are shown in FIG. 20 as including a small high-intensity lamp 230, a Plexi-glass shield 232 and a pressure-tight mounting structure 234. The sight glass is located to permit the operator of the system to check product flow, system operability, film formation, and liquid level.

Although only one steam inlet is shown in the apparatus of FIG. 20, the system preferably includes two steam inlets 196 positioned on opposite sides of the sterilizer 176, as illustrated in FIG. 23. The two steam inlets are fed by a common culinary steam line which delivers equal volumes of steam to both inlets 196. This line is sized to deliver properly filtered culinary steam to the sterilizer at an appropriate pressure, such as 75 psi.

Steam flow into the sterilizer is controlled by a conventional steam control valve 236, such as a Foxboro Model V1400UE, which is in turn controlled by a temperature-pressure cascade loop, to be described in more detail. A product temperature sensor 242, located near the end of holding tube 226, senses the product temperature. A signal representing this temperature is applied via a line 265 to a first controller-recording 243, such as a conventional Foxboro Model 44/BP unit. This unit includes an adjustable set point reference 245 which is initially set (manually, for example) to the desired product sterilizing temperature of the system. The output of the controller recorder 243 is an error signal representing the difference between the set point temperature and the actual temperature measured by the sensor 242. This output signal is applied to a second conventional controller recorder 247, preferably identical to the unit 243, serving as the set point input thereof. The second controller recorder may be characterized as a pressure controller while the first may be characterized as a temperature controller.

A conventional pressure probe 238 monitors the steam pressure delivered to the sterilizer and applies a corresponding signal to the second controller recorder 247 as an input thereto. An error signal representing the difference between the pressure signal on line 240 and the output of controller recorder 243 is produced by controller 247 and applied via a line 249 to the valve 236 to regulate steam flow into the sterilizer.

The illustrated system utilizing two cascaded controller recorders eliminates instabilities that occur if only one controller is used. As an alternative to the illustrated system, the desired sterilizing steam pressure can be used as the set point reference 245 and the pressure signal on line 240 can be supplied to the first controller 243, while the temperature signal on line 265 can be supplied to the second controller 247. This arrangement works equally well.

If the lower conical section 180 of the sterilizer is to be air cooled, a low-pressure feed of ambient temperature is supplied to the inlet 188 through conventional equipment including a pressure regulator 244, a pressure gauge 246, and a remote control valve 248. The cooling air supply may be replaced by a cooling water supply with equivalent regulatory components designed for handling water flow. Similarly, as mentioned earlier, the use of a Teflon cone 192 inside the conical region 180 can eliminate the need for the air or water cooling network.

An additional air supply is used to force liquid through the holding tube 226 and the rest of the system during cleaning or during cooling down of the system when steam is not being used. This supply may be a conventional one-half inch air line 250. This air inlet can be joined to the steam line 196 at any point between the steam control valve 236 and the sterilizer 176. The air inlet line should be provided with a check valve 252, a pressure gauge 254, a remote control valve 256, and a pressure regulator 258.

Product for treatment in the sterilizer 176 is supplied via a main supply line 266 which is coupled to a plurality of supply pipes 52, each feeding one of the film forming heads 54. In FIG. 23 each of the supply pipes 52 is shown as having a manual valve 262 to provide individual flow adjustment to each of the film forming heads. These manually adjustable valves may be eliminated simply by utilizing the distribution "tree" concept illustrated in FIGS. 15 and 16. The main supply line 266 includes an input product temperature sensor 264 and a product line check-valve 267 which is placed in the main supply line just before the temperature sensor.

A liquid level sensor 268 may be used to monitor the level of product at the bottom of the sterilizer 176. As shown, the device is preferably a non-contacting conventional magnetic or gamma ray device including an energy projector 270 and an energy sensing device 272. Similarly, an optional non-contacting flowmeter 274 of conventional design may be coupled to the holding tube 226 to monitor the flow of product through the holding tube. The holding tube itself is a sanitary line for transferring the product from the sterilizer 176 to the vacuum chamber 224. The residence time of the fastest-moving particle of product in the holding tube is considered to be the holding tube time. A removable orifice 276 is installed at the end of the holding tube where it enters the vacuum chamber 224. The orifice 276 serves as both an expansion valve and a control of the flow rate through the holding tube. The size of the orifice 276 is established experimentally by operating the system at different known flow rates and observing the liquid level in the sterilizer after the system has stabilized. For a flow rate of 3,000 gallons per hour, for example, an orifice of approximately one ich is used. Similarly, for a flow rate of 600 gallons per hour, an orifice of approximately ⅜ inch is used.

The proper size orifice will maintain a constant product level at the bottom of the sterilizer in the outlet pipe 182. Since the flow rate of a liquid through an orifice is effected by its specific gravity, the liquid level in the outlet pipe 182 of the sterilizer will change slightly if the specific gravity of the liquid changes. Therefore a supply of variously sized orifices will be required if products with widely differing specific gravities are to be processed in the system at a constant flow rate.

It is noted that the temperature sensor 242 is used in conjunction with the controller recorder 243 to record the legal holding tube temperature and to activate a flow diversion valve (described in the discussion of FIG. 24), located elsewhere in the processing system if legal temperatures are not maintained. Another heat sensor 282, which is an indicating thermometer, is positioned adjacent to the end of the holding tube for sensing the product sterilization temperature and can be visually checked.

In the vacuum chamber 224, the temperature of the milk is virtually instantaneously lowered to about 160° F. at a vacuum of approximately 20 inches of mercury. This rapid reduction in pressure causes removal of all of the absorbed steam and returns the processed liquid to its ordinary concentration. More importantly, the reduction in temperature of the product, particularly where milk is concerned, reduces the sensitivity of the product to taste distortion which could be caused by extensive physical perturbations or agitation. Thus, once it is cooled in the vacuum chamber, handling of the milk product becomes less critical. However, it is noted that the product must pass at high temperature through the outlet pipe 182 and the holding tube 226 before it reaches the vacuum chamber. Thus handling of the milk as it passes through the holding tube is also critical since flavor distortion can easily occur in the holding tube itself. Furthermore, the flow of processed product through the holding tube must be very closely monitored to prevent either a buildup of excess product in the sterilization chamber or a drop in the level of fluid in the outlet pipe 182. An accumulation of excess material in the sterilization chamber can result in splashing, and the resultant undesirable physical agitation of the product at the bottom of the sterilization chamber as well as burning on of droplets of splash material that reach hotter portions of the sterilization chamber wall. Furthermore, if the product is not steadily withdrawn from the sterilization chamber, its time of treatment at high temperature increases and accordingly flavor distortion can occur due to excessive high temperature exposure (i.e., overheating of the product). Fluctuations in the level within the sterilization chamber can thus lead to non-uniformity in the resultant product which is very undesirable from the quality control standpoint.

If, on the other hand, the level of fluid drops too low in the outlet pipe 182, steam bubbles may be trapped in the outlet pipe and the holding tube 226. Such steam bubbles affect the holding time and cause it to become unpredictable, again creating the possibility of non-uniformity in the treated product. The same steam bubbles also collapse unpredictably and cause localized heating of the product and excess deposits on the walls of the holding tube 226. Such deposits can reduce the diameter of the holding tube and thus further restrict flow leading to a continual backup of fluid within the sterilization chamber, and consequent further loss of quality in the product being processed. Burning on of milk solids to the walls of the holding tube can also result from the lack of a steady flow of product (i.e. a brief delay in passing through the holding tube). Again, deposits may be created on the walls of the holding tube further reducing flow and also imparting a burnt flavor to the milk product as it emerges from the holding tube. For all of these reasons, it is essential to accurately control the fluid level at the bottom of the sterilization chamber (or top of the outlet pipe 182) and to control the flow rate through the holding tube 226.

Accordingly, a very precise system is necessary for controlling the fluid level at the bottom of the sterilization chamber and for controlling fluid flow through the holding tube 226. In addition to being accurate and reliable, however, such a control system must also be such that it does not engage the hot fluid product, can be kept sterile with little or no difficulty, and can be produced at a cost which is not prohibitive. To meet all of these criteria, a unique method and apparatus was developed for maintaining the fluid flow and fluid level in the system of the invention. The unique apparatus relies upon maintaining a pressure equilibrium and is characterized as a "balanced force" technique.

In developing this technique it was first determined by extensive experimentation that the optimum fluid level was a level at the junction between the bottom of the sterilization chamber 176 and the top of the outlet pipe 182, as indicated at 284 in FIG. 23. Maintaining the level 284 results in a liquid seal at the bottom of the sterilization chamber prohibiting the escape of steam or steam bubbles into the holding tube. It further essentially eliminates the possibility of splashing within the sterilization chamber and results in a steady flow of material through the holding tube 226.

The balanced force control is established by adjusting a valve 267 to an appropriate setting so that a desired flow rate of product is introduced into the sterilization chamber 176. Once this setting is known for a given product, the valve 267 may be replaced by an orifice plate or the piping may simply be sized to produce the desired rate at all times. Steam must then be introduced through the supply pipe 196 at an appropriate temperature and pressure to provide adequate heating of the product. The orifice 276 is then set to maintain the desired liquid level 284 at the bottom of the sterilization chamber. This level is checked by the use of the liquid level sensor 286. It has been discovered empirically that for a given sized orifice 276, a single liquid level is established in the sterilization chamber 176 when all other conditions remain constant as one would expect. It was also discovered that large system variations did not significantly change the liquid level and moreover did not cause instability in system dynamics. This was completely unexpected. It is a significant finding since level and flow control in the sterilizer and holding tube are critical to the film formation and to preventing overheating and flavor distortions. This finding meant that a fixed orifice is all that would be needed to accurately control the level in the sterilizer and the flow rate through the holding tube.

As an alternative to adjusting the orifice 276, a valve may be installed in place of the orifice 276 and adjusted to the proper flow rate. Once the proper rate is established for a particular system, the valve can be removed and replaced by an orifice permitting the same flow rate.

Data supporting the operation of the force balance method is set forth in TABLE 3. As indicated in the table, it has been observed experimentally that a very stable flow rate was established when the force balance level control method was used as opposed to using a conventional feedback control system for modulating the holding tube back pressure. This was observed using a conventional magnetic flow meter 274 with readings recorded on a conventional circular chart. As seen from TABLE 3, significant variations in system parameters, such as flow rate, sterilizer pressure, and temperature do not cause instability or loss of the liquid level. Moreover, the change in the liquid level is very small (less than 2") even when large variations occur in the flow rate and sterilizer temperature and pressure as seen in TABLE 3. It is thus accordingly seen that a stable configuration is established.

The most important and critical aspect of this "balanced force" method is that large changes in system dynamics that would likely occur during a commercial operation do not cause instability in the liquid level due to a balancing of system forces. For example, suppose an orifice is sized and placed at the end of the holding tube to provide the proper level. If the flow rate is increased by 20%, one would expect the level to continuously rise and fill the sterilizer. This does not occur. In fact, an increase in the flow rate to the sterilizer results in a very small increase in the liquid level which again becomes stable. The increased flow rate requires additional steam, which requires additional pressure, which forces more product at the outlet of the sterilizer, thus counteracting the increased flow input. The discovery of the stability of this method is critical to system operation.

To prevent flavor distortion due to contact between the heated product and a metal surface, the entire inner surface of the outlet pipe 182 and the holding tube 226 may be coated with an appropriate inner material such as Teflon, or the holding tube may be formed of an inert material such as glass.

TABLE 3

Balanced Force Level Control Method Data (Orifice 276 = 1")

| PARAMETER | RUN 1 | RUN 2 | RUN 3 |
|---|---|---|---|
| Flow Rate (GPM) | 10.7 | 8.1 | 9.7 |
| Sterilizer Pressure (psig) | 37 | 21 | 28.5 |
| Sterilizer Temperature (°F.) | 285 | 248 | 270 |
| Liquid Level (0–100 = 6") | 53 | 60 | 70 |

Sterilizer Inlet Temperature was constant at 159° F.
Flash Chamber Vacuum was constant at 21" mercury.

A "pop-off" or maximum pressure valve 286 may be coupled to the steam supply pipe 196 as a simple and effective way of ensuring that steam pressure does not rise above a predetermined value. This valve prevents the steam pressure from rising in the sterilization chamber 176 and thus maintains the chamber pressure below a specified maximum. If the steam supply should increase above a specified maximum, flow would increase through the holding tube above a specified limit and the level 284 would drop below the optimum position. The pop-off valve 286 provides a device for preventing this situation from developing.

It should be pointed out that the balanced force level control method works similarly with non-condensable gases, such as air. This is very useful in cleaning closed vessels within the present system. More particularly, a selected air pressure is maintained in the sterilization chamber which will result in a constant level and flow rate. The constant level improves the ability of the pressure vessel to be cleaned and eliminates the need for a pump at the discharge or bottom end of the pressure vessel.

The design of the holding tube 226 for an ultra-high temperature (UHT) system in accordance with the present invention is particularly critical since many of the flavor distortions which have been eliminated in the unique design of the sterilization chamber 176 can be reintroduced into the product by various effects occurring within the holding tube. It is particularly necessary to avoid agitation and turbulence in the holding tube as oiling off and fat separation can then occur. A very smooth and continuous rate of flow through the holding tube is essential to product quality and uniformity. Thus even a negative feedback control network which might be coupled between a valve placed at the position of orifice 276 and the flow meter 274 or level detector 268 might cause oscillations in the flow rate or other variations in the flow rate which could introduce turbulence and undesirable pressure variations into the holding tube. The balanced force method, on the other hand, permits a totally fixed system to be produced wherein the possibility of flow rate and pressure fluctuations is virtually eliminated.

Concerning holding tube design, it is pointed out that there are three critical operations in UHT processing where the product can be severely damaged; heating to ultra-high temperatures, holding at ultra-high temperatures, and cooling from ultra-high temperatures. Using the sterilizer 176 of the invention, the potential damage to the product during the heating operation is reduced, and flash cooling in the vacuum chamber 224 which is nearly instantaneous, minimizes product damage during the cooling operation. Further discussion of the design of the holding tube so as to minimize damage to the product is required.

Because of the viscosity, product particles move through a holding tube with different velocities and hence different resident times. The greatest variation in residence times of product particles occurs with laminar flow. The average velocity through a pipe is:

$$V_{avg} = 4Q/\pi D^2 \quad (1)$$

and the Maximum Velocity is:

$$V_{max} = 2V_{avg} = \frac{8Q}{\pi D^2} \quad (2)$$

where Q is the flow rate.

Since $V_{max} = L/t$ in a pipe, the length of the pipe for t seconds residence time of the fastest moving particles then becomes:

$$L = \frac{8}{\pi} \frac{Q}{D^2} t \quad (3)$$

where Q is in cubic inches, converting the flow into gallons per second we obtain the desired equation for determining the holding tube length:

$$L = 588.24(Qt/D^2) \quad (4)$$

Where:

L = holding tube length (inch)

Q = flow rate (gallon per second)

t = holding time (second)

D = inside diameter of holding tube (inch)

Using the above equation, holding tube length for a one second holding time was calculated for various tube diameters:

TABLE 5

HOLDING TUBE LENGTHS FOR UHT PROCESSING WITH A PUMPING RATE OF ONE GALLON PER SECOND

| time = 1 sec. | 1 | 1½ | 2 | 2½ | 3 |
|---|---|---|---|---|---|
| Holding Tube length (In.) | 723 | 300 | 168 | 105 | 71.4 |

Lengths of holding tubes of various diameters can now be calculated using table 1 and the following formula:

$$A = B \times C \times D \quad (5)$$

Where:

A = holding tube length (inch)

B = measured flow rate (gallon per second)

C = holding tube length from Table 1 (inch)

D = holding time (second)

EXAMPLE 1

Calculate the holding tube length for a 600 gallon/-hour flow rate and a 2 second minimum holding time using a 1½ inch holding tube. Using equation (5) and the table:

$$A = \frac{600 \text{ gal.}}{\text{hr}} \times \frac{1 \text{ hour}}{3600 \text{ sec.}} \times 300 \times 2$$

A = 100 inches or 8.33 feet

EXAMPLE 2

Calculate the holding tube length for a 3,500 gallons/hour flow rate and a 2 (two) second minimum holding time using a 3 inch holding tube. Using equation (5) and the table:

$$A = \frac{3500 \text{ gal}}{\text{hr}} \times \frac{1 \text{ hr}}{3600 \text{ sec.}} \times 71.4 \times 2$$

A = 138.83 inches or 11.57 feet

There are many constraints on holding tube design. Some of the more important constraints are: Bacteriological, Legal, Organeleptic, Orthokinetic Flocculation, Pressure, and Turbulence.

The bacteriological constraint is perhaps the most important and is the major reason for neating the product. The level of microbial destruction desired will determine the lower bound on the heat treatment. In the United States as well as many other countries, minimum legal standards are required for pasteurization and sterilization of dairy products. Pasteurization heating requirements are designed to eliminate disease causing bacteria while sterilization is designed to inactivate all microorganisms and enzymes. The legal U.S. standards for pasteurization consist of holding times of 15, 1, 0.5, 0.1, 0.05, and 0.01 second for temperatures of 161°, 191°, 194°, 201°, 204°, and 212° F., respectively. For sterilization, the legal standard consist of a holding time of 2 seconds for a temperature of 280° F. Note that these are minimal requirements and may be exceeded without any consequence to the bacteriological or legal requirements. These constraints, therefore, call for the highest possible holding time.

While the bacteriological and legal constraints call for a very severe heat treatment, the organeleptic constraint calls for a minimal heat treatment since a severe heat treatment adversely affects the product. Because the rate of microbial destruction becomes much higher than the rate of chemical and physical changes as the processing temperature increases, the organeleptic constraint calls for a minimal holding time at the highest possible temperature.

Extensive research at USDA Dairy Products Laboratory indicated that orthokinetic flocculation plays an important role in the coagulation process of UHT treated milk, milk concentrates, and other dairy products. The results of the study indicate that high-velocity gradients in the holding tube at ultra-high temperatures should be avoided. To reduce these gradients, the holding tube diameter should be as large as possible. A theoretical determination of the minimal holding tube diameter which will minimize orthokinetic flocculation is:

$$d^3 \geqq \frac{64\, r^3 \eta Q}{\pi k T} \quad (6)$$

Where:

d = holding tube diameter (cm)

r = particle radius (cm)

$\eta$ = viscosity (poises)

Q = Flow Rate (cc/sec.)

k = Boltzman's constant ($k = 1.38 \times 10^{-16}$ ergs/degree) and t = Absolute Temperature (°K.)

For a 3 to 1 milk concentrate the following data were used:

$r \leqq 2.5 \times 10^{-5}$ cm $\eta = 0.02$ poise

Q = 100 cc/sec.

T = 410° K. or 278.6° F.

Substituting in (6) one obtains:

$d \geqq 2.3$ cm (or 0.9 inches)

Allowing a factor of safety of 100% one obtains a value of approximately 5 cm or 2 inches.

For fluid milk assuming the following data:

$r \leqq 2.5 \times 10^{-5}$ cm $\eta = 0.01$ poises

Q = 600 gals/hr

T = 410° K.

$$d^3 \geqq \frac{64(2.5)^3 10^{-15} \text{ cm} \times 0.01}{1.38 \times 10^{-16} \times 410} \times \frac{600 \text{ gal}}{\text{hr}} \times \frac{3785 \text{ cc}}{1 \text{ gal}} \times \frac{1 \text{ hr}}{3600 \text{ sec}}$$

$d^3 \geqq 35.49$ $d \geqq 3.3$ cm (or 1.3 inches)

With 100% safety factor $d \geqq 2.5$ inches or as large as possible

The Orthokinetic Flocculation constraint, therefore, calls for the use of the largest possible holding tube diameter.

Absolute pressure in the holding tube must be maintained above the product saturated vapor pressure to avoid flashing in the tube and the possible accumulation of non-condensable gases which would cause a decrease in holding time. An absolute pressure 0.6 atm. (8.82 psig) above the saturation pressure in the holding tube is sufficient to eliminate any decrease in holding time. Agitation and turbulence at high temperatures, particularly in the holding tube should be avoided, since it causes oiling-off and fat separation in the processed product. The pressure constraints, therefore, dictate that an absolute pressure at least 9 psig greater than the product saturated vapor pressure be used in the holding tube. Such pressure should not be high enough to cause turbulence. Agitation in the holding tube should also be avoided.

From the preceding discussion it is apparent that the design of the holding tube for UHT processing in accordance with the teachings of the invention is critical and may have a significant effect on product quality. The tube length should be designed so that the fastest moving particles will attain the minimum residence time required for pasteurization or ultra-pasteurization. Equation (4) derived from fluid mechanics provides a rationale for calculating the holding tube length for the fastest moving particle, i.e.:

$$L=588.24(Qt/D^2)$$

There are many constraints which must be considered in designing a holding tube, most important of which are the following:

1. Bacteriological and Legal—These constraints determine the minimal holding time and temperature required. Pasteurization calls for a holding time of 15, 1, 0.5, 0.1, 0.05, and 0.01 second for temperatures of 161°, 191°, 194°, 201°, 204°, and 212° F., respectively. Sterilization calls for a holding time of 2 seconds for a temperature of 280° F.;

2. Organeleptic—This constraint calls for the least possible holding time at the highest possible temperatures;

3. Orthokinetic Flocculation—This constraint calls for the largest possible diameter for the holding tube;

4. Pressure and Turbulence—This constraint calls for an absolute pressure at least 9 psig higher than the product saturation vapor pressure in the holding tube but not high enough to cause turbulent flow. Agitation in the holding tube should also be maintained.

The holding tube 226 of the present invention is designed to meet these constraints and provide optimal product quality.

Further discussions of holding tube design may be found in the following reference materials.

Dickerson, R. W., R. B. Read, and H. E. Thompson. "Performance Tests for Plate Heat Exchangers Used for Ultra-High-Temperature Pasteurization Processes." Report of Public Health Service, Food and Drug Administration, Division of Microbiology, U.S. Department of Health, Education, and Welfare. Cincinnati, Ohio, 1968.

Leviton, Abraham, H. E. Vettel, and J. H. Vestal. "Practical Reduction of Orthokinetic Flocculation in Processing of Sterile Milk Concentrates," Journal of Dairy Science. Vol. XLVIII, No. 8 (August, 1965), pp. 1001-9.

Nahra, J. E. "The DASI Free-Falling Film Method for the Pasteurization and Sterilization of Dairy Products." Presented at Ohio State University. Feb. 14, 1974.

Shames, Irving H. Mechanics of Fluids. New York: McGraw-Hill Book Co., Inc,, 1962.

Stroup, W. H., R. W. Parker, and R. W. Dickerson. "Steam Infusion Heater for Ultra-High-Temperature Pasteurization," Journal of Dairy Science, Vol. LV, No. 4 (April, 1972) pp. 537-9.

Figure 24:
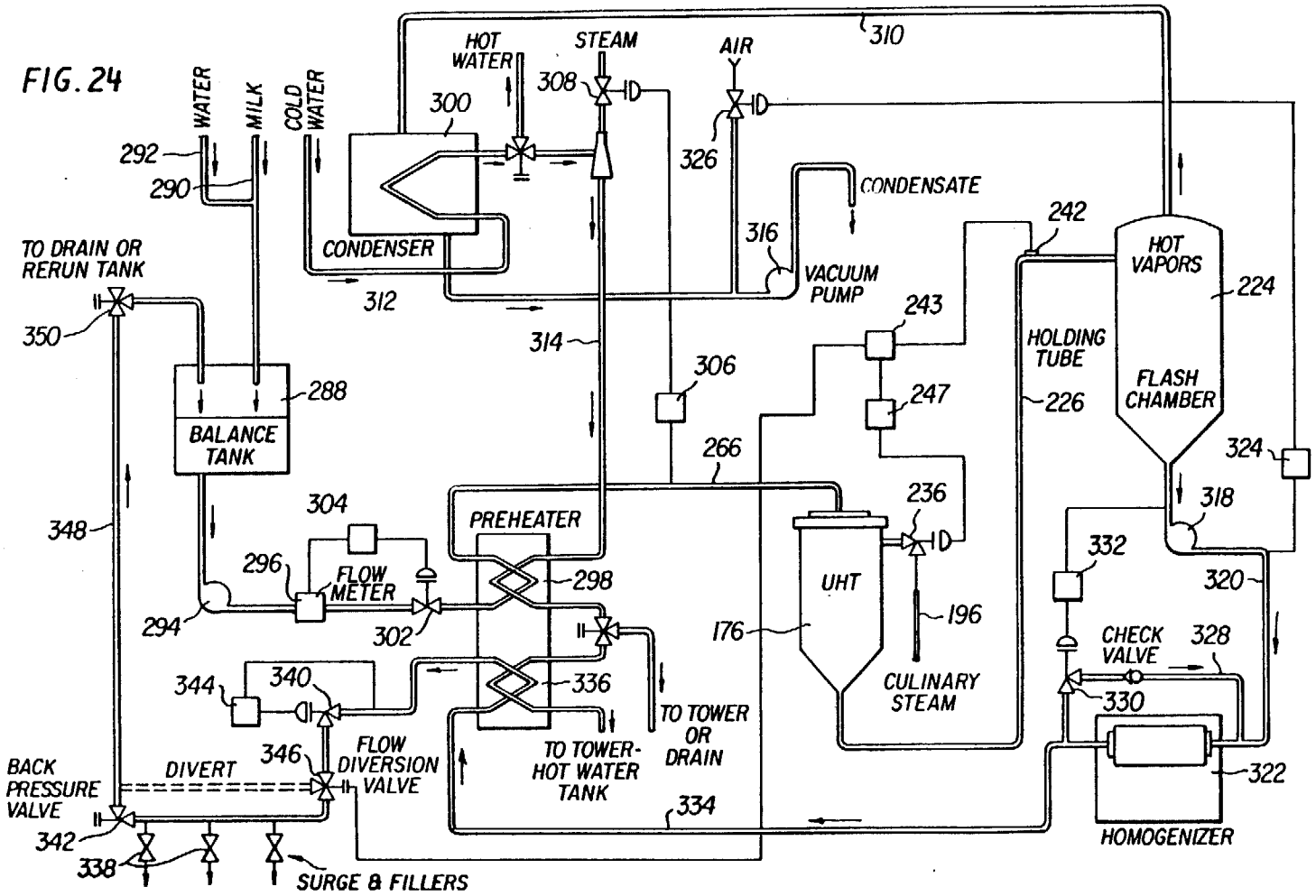
FIG. 24 is a schematic illustration in perspective of a liquid processing system employing the sterilization chamber of the invention.

Attention is now directed to FIG. 24 which illustrates the sterilizer 176 of the present invention in conjunction with a complete processing system. In the system, the raw input product, such as raw milk, enters a balance tank 288 through a supply pipe 290, to which a water feed pipe 292 may also be coupled. The product enters the balance tank 288 at approximately 4° C. (40° F.). It is pumped out of the balance tank by a centrifugal pump 294, through a conventional flowmeter 296 to a conventional pre-heater 298 where it is heated to approximately 80° C. (176° F.) by water which has previously been used to cool vapors in a flash chamber condenser 300. A variable valve 302 is coupled to the flowmeter 296 through a conventional feedback servo network 304 to regulate the system flow rate at the output of centrifugal pump 294. A conventional temperature sensor and servo network 306 monitors the temperature of the product in line 266 and controls the application of heated culinary steam to the preheater 298 via a valve 308 in accordance with the product temperature.

The preheated product enters the UHT sterilizer 176 where it is formed into films, as previously described, and heated to a temperature of approximately 143° C. (290° F.). Steam pressure maintains a predetermined level in the UHT heater, in accordance with the balanced forces control network previously described, and pushes the product through holding tube 226 into flash chamber 224 where the product is instantaneously cooled to 82° C. (180° F.). The same amount of steam used in the UHT sterilizer 176 is flashed off in the flash chamber by controlling the vacuum therein. In this regard it is noted that hot vapors are drawn off from the flash chamber through a line 310 and supplied to the condenser where they are condensed by cold water supplied through a line 312. The cold water is heated in this process and delivered to the preheater 298 via a line 314. A conventional vacuum pump 316 evacuates the flash chamber and condenser.

The cooled product is removed from the flash chamber by a conventional aseptic product removal pump 318 and is delivered via a line 320 to a conventional homogenizer 322 where a homogenizing pressure of approximately 200 kg/cm$^2$ (3000 psig) is maintained. A conventional temperature control and servo network 324 couples the line 320 with an air valve 326 to control the vacuum within the flash chamber and thus control the temperature of the product delivered to the homogenizer. The product level in the flash chamber 224 is controlled by a by-pass line 328 around the homogenizer 322. A check valve 330, controlled by a conventional level sensing and servo network 332 controls the delivery of product to the by-pass line.

The homogenizer 322 pushes the processed product through a line 334 to a conventional aseptic cooler 336 where cold water from the preheater cools the product from 85° C. (185° F.) to 20° C. (68° F.) for aseptic storage or for direct filling of aseptic packages by means of a series of conventional output surge and filler valves 338, back pressure valves 340 and 342 maintain a positive pressure in the aseptic product lines to minimize the risk of contamination. A conventional pressure monitor and servo network 344 controls the operation of back pressure valve 340. A flow diversion valve 346 is controlled by the controller recorder 243 in response to temperature measurements of the product within the holding tube 226. If the temperature in the holding tube falls below the legally-required minimum. the flow diversion valve is activated to divert the improperly-processed product back to the balance tank via a line 348 and a drain/rerun valve 350 to the balance tank 288 for reprocessing. If the legally required temperatures are maintained within the holding tube, the diversion valve remains closed and the process product is delivered directly to the surge and filler valves.

It is noted that the system may be completely automated with an initial sterilization cycle using hot water, a product cycle and a subsequent cleaning in place cycle.

The major aspects of the present invention discussed herein together cooperate to produce results which have long been sought after but have been unattainable using prior art technology. These results are the efficient and continuous production of fully sterilized milk which is virtually indistinguishable from fresh whole milk in taste. Tests on samples produced by the present system conducted at the University of Maryland have proven that test samples of milk produced utilizing the system of the invention can be stored unrefrigerated for periods of up to eight weeks with no significant taste difference when compared with fresh, pasteurized milk. Furthermore, in taste tests held at the University of Minnesota in July, 1977 milk produced in accordance with the general method of the present invention was compared to regular pasteurized milk and to sterilized milk using conventional technology. The product produced using the present invention received the highest score of all products indicating taste preference by the panel of testers. These results confirmed earlier tests conducted in 1976 by the Dairy Marketing Forum sponsored by the U.S. Department of Agriculture Cooperative Extension Service and the University of Illinois at Urbana Champaign.

In operation, the apparatus of the invention, which may be characterized as an ultra high temperature (UHT) sterilizing system, receives preheated products from an appropriate source. This product is formed into one or more continuous and fully isolated falling films of product. Virtually any number of independent falling films may be produced in the sterilization chamber 176, depending only upon the size of the chamber. Naturally, sufficient spacing must exist within the chamber to prevent interference among the various films. The falling film is characterized by the fact that it never engages any surface which is hotter than itself. It is formed using a distribution head having a plurality of properly spaced apertures to maintain careful control over the film thickness and shape. The falling film is subjected to extremely rapid heating to a temperature in the range of between 280° and 300° F. by fully saturated culinary steam. Special baffling and steam distribution techniques are used in accordance with the invention to prevent the steam from disturbing the continuous nature of the falling film. This is highly significant in the context of the present invention since the film must fall to the bottom of the sterilization chamber without being disturbed or split into components to prevent taste distortion. The careful reduction in steam velocity and ultimate distribution of steam around the falling film's product prevent the steam from interfering with the continuous nature of the falling film. Similarly, the height of the film is carefully adjusted as is the flow rate of the product forming the film so that the film falls to the bottom of the sterilization chamber without breaking into droplets or otherwise becoming discontinuous. As such, surface tension holds all particles of the film together even as they strike the bottom of the chamber. As a result no splashing or substantial agitation occurs as the film reaches the bottom of the chamber and is fed into the outlet pipe. To prevent agitation, splashing or other physical disturbance of the fluid in the outlet and holding pipes, extremely accurate control of the fluid level at the bottom of the sterilization chamber is required. To meet this requirement, and to meet the requirement of maintaining extremely steady flow through the holding tube and to still preserve the easily cleanable nature of the equipment, a balanced force technique has been developed. The advantage of this technique is that it eliminates expensive controls which could contaminate the milk product, could be difficult to maintain in a sterile condition and might be subject to failures of malfunctioning which would result in perturbations in the fluid and flow level resulting in turn in inconsistencies in the output product. The balanced force technique, however, eliminates all of these inefficiencies simply by controlling the input flow and regulating output flow in such a way that a fixed fluid level is found and maintained to keep the system fully stable and operational with virtually no risk of failure or product distortion.

The principal advantages of the continuous, isolated falling film sterilization method and apparatus of the present invention can be summarized as follows:

- Flavor—Product (e.g., milk) flavor as good as or better than pasteurized. Chalky, sandy or burnt flavors associated with UHT milk eliminated.
- Consistency—Because of the inherent design of the system, product quality is consistent throughout the production run.
- Minimum Product Damage—Due to the inherent characteristics of the free falling film UHT heater minimum product damage results for desired sterilizing effect. Product characteristics such as fat separation and sedimentation in milk and lack of whipping ability in cream processed with conventional UHT systems does not occur using the process and apparatus of the invention.
- Large Flow Rates—Small as well as large flow rates are possible. As little as 100 gph to more than 5000 gph. This makes large operations economically feasible.
- Variable Flow Rates—The flow rate of the system can be varied substantially ±20% without losing stability. This feature will limit the need for large aseptic surge tanks which are a high cost item.
- Product Variety—System can be used for many products with a wide range of physical parameters including viscosity, specific weight, specific heat, heat sensitivity, and others.
- Long Running Times—System can be run for a long period of time without shutdown. Twenty hour per day operation should be feasible.
- Minimum Cleaning—System can be cleaned in place (CIP) automatically. Minimum time is needed because of minimum deposit (burn-on) on hot surfaces.
- Efficient Energy Utilization—The present UHT heater has high heat transfer efficiency (more than 95%); moreover, there is no reduction in heat transfer efficiency as a function of running time.

Large Range of Temperature Increases—A large range of temperature increases are possible in the present UHT heater. As little as 20° F. increase to as much as 250° F. increase in less than one third (⅓) of a second.

Maximum Heat Penetration—Maximum heat penetration is accomplished by use of the thin isolated, continuous free falling films with saturated steam, and very large heat transfer area.

Pasteurizer, Ultra-Pasteurizer, Sterilizer—System has been cleared by the United States Public Health service as a legal pasteurizer, Ultra-Pasteurizer or sterilizer. Ultra-Pasteurized dairy products in most states would not need to conform to state dating laws.

Minimum Maintenance—The present UHT heater has no moving parts, it is constructed of stainless steel and requires little maintenance. Since the Ultra-High Temperature portion of the system involves only the sterilizer, minimum maintenance is required in other portions of the system. Gasketing of plates or tubular heat exchangers is eliminated or/and reduced.

Manual or Automated—The system can be fully automated or it can be manually operated by a trained operator. The level of automation can be determined by the user.

The present system can be used for processing and heat treating all types of fluent materials. Naturally the characteristics of the material to be treated must first be studied and fully understood before heat treatment can begin. For example, it is necessary for each product to determine the appropriate temperature-time relationship for optimum heating. Once this relationship is determined, the present system can be set to process any fluent material according to very precise time and temperature limitations and with an absolute minimum of physical perturbation or agitation. To prepare the system for treating any such general product, once the time-temperature characteristics of the product are determined, it is first necessary to set the height of the falling film in accordance with the required heating time. Raising the height of the falling film increases the time exposure of the product to heat, while lowering the height of the film reduces the exposure time. Similarly, the temperature and pressure within the sterilization chamber must be set in accordance with experimentally determined optimum values for the product in question. It is then necessary to set to flow rate of the system at an appropriate level. The flow rate is determined by the width and thickness of the falling film, the number of falling films utilized, and by the viscosity of the product. The system can then be adjusted using the balance force technique to operate uniformly at the desired flow rate.

Obviously, numerous additional modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A method for maintaining a stable fluid level in a pressurized fluid processing system including a vessel, independent of large changes in system dynamics, comprising the steps of:

establishing a desired flow rate into said system, permitting said desired flow rate to vary independently of a predetermined fluid level at the bottom of the said vessel, pressurizing and heating said system to a desired level;

collecting said fluid with said predetermined fluid level at the bottom of said vessel, setting constant parameters for a continuous flow outlet means for said system whereby said predetermined fluid level is maintained in said system; and maintaining said setting regardless of said variations in said flow rate into said system.

2. An apparatus for treating fluent material with a heated gas having an initial flow velocity comprising:

a pressure vessel, dispensing means mounted within said vessel for forming at least one isolated, continuous film of said fluent material, baffle means mounted within said pressure vessel for reducing said initial flow velocity of said heated gas and for distributing said gas within said vessel to achieve rapid heating of said isolated, continuous film of said fluent material while subjecting said film to *a* minimum of physical perturbation, fluid outlet means coupled to said vessel for withdrawing treated fluent material therefrom;

holding tube means coupled to said fluid outlet means for maintaining said fluent material at a selected temperature for a selected time interval; and fluid collecting means within said pressure vessel for intercepting said isolated, continuous film and for supplying said treated fluent material to said outlet means with a minimum of physical agitation; wherein said dispensing means comprises:

a structure forming a chamber for receiving a quantity of said fluent material, said structure having a discharge aperture formed therein; and, distribution means positioned within said structure for distributing substantially equal quantities of said fluent material to each segment of said discharge aperture; and wherein the cross-sectional areas of said outlet means and holding tube means are fixed so as to provide balanced force control means for maintaining a stable liquid level in said pressure vessel independent of changes in system dynamics.

3. The apparatus of claim 2 wherein said distribution means comprises:

a structural member having a non-uniform distribution of apertures therethrough, said apertures distributed to form a varying net opening through said structural member.

4. A dispensing head as in claim 3 wherein: said distribution of apertures includes a series of openings of progressively smaller size.

5. A dispensing head as in claim 3, wherein:

said distribution of apertures includes a plurality of openings of similar size spaced to provide a progressively smaller density of openings through said structural member.

6. A dispensing head as in claim 3, wherein said distributing means comprises:

a generally flat plate dividing said chamber within said elongated structure into two sub-chambers.

7. A dispensing head as in claim 3, wherein said distributing means comprises:

a tubular member disposed within said elongated structure and extending along the axis thereof.

8. An apparatus as in claim 2, wherein said dispensing means comprises:

supply pipe means for carrying a flow of said fluent material, branch pipe means coupled to said supply pipe means for dividing said flow therein into a plurality of components; and a plurality of film forming head means coupled to said branch pipe means for forming a plurality of thin, isolated, continuous films of said fluent material.

9. An apparatus as in claim 2, wherein said fluid collecting means comprises:

a conical lower section of said pressure vessel, a layer of non-metallic, chemically inert material of low thermal conductivity covering said conical lower section; and, means associated with said conical lower section for preventing excessive heating thereof.

10. An apparatus as in claim 2, wherein said fluid collecting means comprises:

a conical element formed of a non-metallic, chemically inert material of low thermal conductivity supported within a lower portion of said pressure vessel.

*11. In a system for sterilizing a temperature-sensitive liquid by the use of condensing steam, a method for maintaining a stable level of said liquid in a sterilizing chamber whereby the liquid level is maintained independent of large changes in system dynamics, comprising the steps of:*

*establishing a desired flow rate of liquid to be treated into said system,*

*permitting said desired flow rate to vary independently of a predetermined liquid level at the bottom of said sterilizing chamber,*

*supplying steam to said sterilizing chamber at a predetermined pressure to pressurize and heat the temperature-sensitive liquid by condensing steam,*

*collecting the treated liquid along with the condensed water from the steam at a predetermined level at the bottom of said sterilizing chamber,*

*setting constant parameters for a continuous flow outlet means to provide a continuous flow of treated liquid out of said system whereby said predetermined liquid level is maintained in the sterilizing chamber, and*

*maintaining said setting regardless of variations in the flow rate of the liquid to be treated into said system.*

*12. In a system for sterilizing a temperature-sensitive liquid by the use of condensing steam, an apparatus for maintaining a stable level of said liquid in a sterilizing chamber whereby the liquid level is maintained independent of large changes in system dynamics, comprising:*

*means for establishing a desired flow rate of liquid to be treated into said system while permitting said desired flow rate to vary independently of a predetermined liquid level at the bottom of said sterilizing chamber,*

*means for supplying steam to said sterilizing chamber at a predetermined pressure to pressurize and heat the temperature-sensitive liquid by condensing steam,*

*said chamber being arranged for collecting the treated liquid along with the condensed water from the steam at a predetermined level at the bottom of said sterilizing chamber,*

*an outlet means for setting constant parameters to provide a predetermined continuous flow of treated liquid out of said system whereby said predetermined liquid level is maintained in the sterilizing chamber,*

*whereby said outlet means remains unchanged regardless of variations in the flow rate of the liquid to be treated into said system.*

*13. The system of claim 12 having a holding tube means coupled to said outlet means for maintaining the heat treated temperature-sensitive liquid at a selected temperature for a selected time interval.*

*14. An apparatus for sterilizing a temperature-sensitive liquid with condensing steam having an initial flow velocity comprising:*

*a pressure vessel,*

*dispensing means mounted within said vessel for forming at least one isolated, continuous film of said temperature-sensitive liquid,*

*baffle means mounted within said pressure vessel for reducing said initial flow velocity of said condensing steam and for distributing said condensing steam within said vessel to achieve rapid heating of said isolated, continuous film of said temperature-sensitive liquid while subjecting said film to a minimum of physical perturbation,*

*liquid outlet means coupled to said vessel for withdrawing the treated temperature-sensitive liquid therefrom,*

*holding tube means coupled to said liquid outlet means for maintaining temperature-sensitive liquid at a selected temperature for a selected time interval; and*

*liquid collecting means within said pressure vessel for intercepting said isolated, continuous film and for supplying said treated temperature-sensitive liquid to said outlet means with a minimum of physical agitation;*

*wherein said dispensing means comprises:* a structure forming a chamber for receiving a quantity of said temperature-*sensitive liquid, said structure having a discharge aperture formed therein; and,*

*distribution means positioned within said structure for distributing substantially equal quantities of said temperature-sensitive liquid to each segment of said discharge aperture; and wherein the cross-sectional areas of said outlet means and holding tube means are fixed so as to provide balanced force control means for maintaining a stable liquid level in said pressure vessel independent of changes in system dynamics.*

* * * * *